United States Patent
Tanaka et al.

(10) Patent No.: US 10,501,042 B2
(45) Date of Patent: Dec. 10, 2019

(54) RADIANT HEATER APPARATUS

(71) Applicant: DENSO CORPORATION, Kariya, Aichi-pref. (JP)

(72) Inventors: Yusuke Tanaka, Kariya (JP); Kimitake Ishikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/419,480

(22) Filed: May 22, 2019

(65) Prior Publication Data

US 2019/0270425 A1 Sep. 5, 2019

Related U.S. Application Data

(63) Continuation of application No. PCT/JP2017/039799, filed on Nov. 2, 2017.

(30) Foreign Application Priority Data

Dec. 20, 2016 (JP) .................. 2016-246980

(51) Int. Cl.
*B60R 21/2165* (2011.01)
*B60H 1/22* (2006.01)
*B60R 21/206* (2011.01)

(52) U.S. Cl.
CPC ....... *B60R 21/2165* (2013.01); *B60H 1/2226* (2019.05); *B60R 21/206* (2013.01)

(58) Field of Classification Search
CPC .. B60R 21/2165; B60R 21/206; B60H 1/2226
See application file for complete search history.

(56) References Cited

U.S. PATENT DOCUMENTS

| 6,106,003 A | 8/2000 | Rahmstorf et al. |
| 7,651,122 B2 * | 1/2010 | Kim ..................... B60R 21/2165 |
| | | 280/728.3 |
| 9,769,879 B2 * | 9/2017 | Ota ....................... B60H 1/2215 |
| 9,873,309 B2 * | 1/2018 | Sagou .................. B60H 1/2215 |

(Continued)

FOREIGN PATENT DOCUMENTS

| JP | 2001502990 A | 3/2001 |
| JP | 2008030672 A | 2/2008 |

(Continued)

*Primary Examiner* — Faye M Fleming
(74) *Attorney, Agent, or Firm* — Harness, Dickey & Pierce, P.L.C.

(57) ABSTRACT

A radiant heater apparatus includes an interior panel, a heater main body, and a cover layer. The interior panel includes a deployment portion to be deployed into a cabin space due to a deployment of an airbag apparatus. The deployment portion has a breaking edge where a panel tear portion breaks when the airbag apparatus is deployed. The panel tear portion includes a centerline portion and a pair of sideline portions. The deployment portion includes the breaking edge that is formed along the centerline portion or the sideline portions. The deployment portion has a stress concentration portion that locally applies stress to the cover layer while at least a part of the breaking edge formed along the centerline portion is not in contact with the cover layer, when the deployment portion is deployed and comes into contact with the cover layer.

5 Claims, 15 Drawing Sheets

(56) References Cited

U.S. PATENT DOCUMENTS

| | | | |
|---|---|---|---|
| 10,104,719 B2* | 10/2018 | Ishikawa | F24D 13/02 |
| 2009/0278338 A1 | 11/2009 | Takahiro et al. | |
| 2012/0234932 A1* | 9/2012 | Okamoto | F24H 3/002 |
| | | | 237/2 R |
| 2013/0068440 A1* | 3/2013 | Kamiyama | B60H 1/00849 |
| | | | 165/202 |
| 2015/0110477 A1* | 4/2015 | Ota | B60H 1/2215 |
| | | | 392/435 |
| 2016/0059669 A1* | 3/2016 | Sagou | H05B 3/20 |
| | | | 392/435 |
| 2016/0068044 A1* | 3/2016 | Sagou | B60H 1/2215 |
| | | | 165/203 |
| 2017/0080779 A1* | 3/2017 | Sagou | B60H 1/00285 |
| 2017/0118801 A1* | 4/2017 | Ishikawa | F24D 13/02 |
| 2017/0129310 A1* | 5/2017 | Sagou | B60H 1/2225 |
| 2017/0144507 A1* | 5/2017 | Seki | B60K 37/00 |
| 2017/0349029 A1* | 12/2017 | Sagou | B60H 1/22 |
| 2018/0105017 A1* | 4/2018 | Seki | H05B 3/20 |
| 2018/0194199 A1* | 7/2018 | Oh | H05B 3/12 |
| 2018/0201095 A1* | 7/2018 | Sakane | B60H 1/2218 |
| 2018/0208021 A1* | 7/2018 | Seki | F24D 13/02 |
| 2018/0257456 A1* | 9/2018 | Oh | H05B 3/14 |

FOREIGN PATENT DOCUMENTS

| | | |
|---|---|---|
| JP | 2010023567 A | 2/2010 |
| JP | 2014189251 A | 10/2014 |

* cited by examiner

HEAT TRANSFER IS RESTRICTED

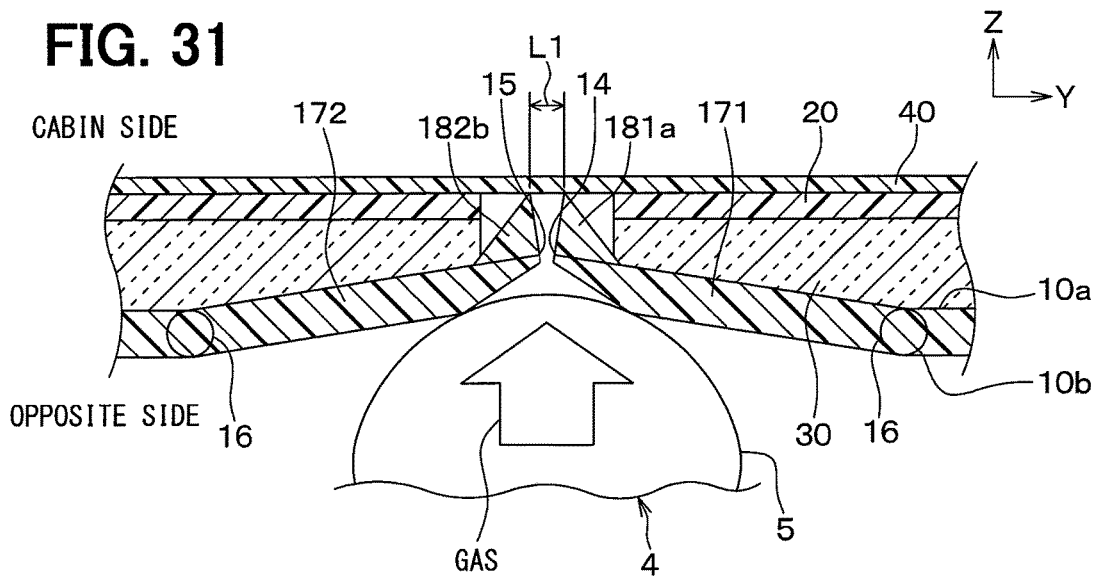
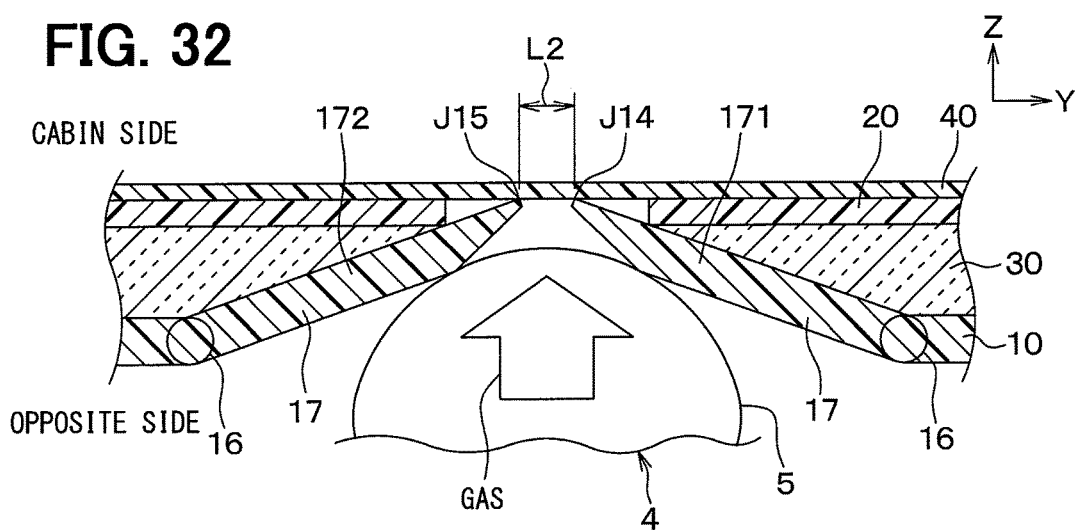
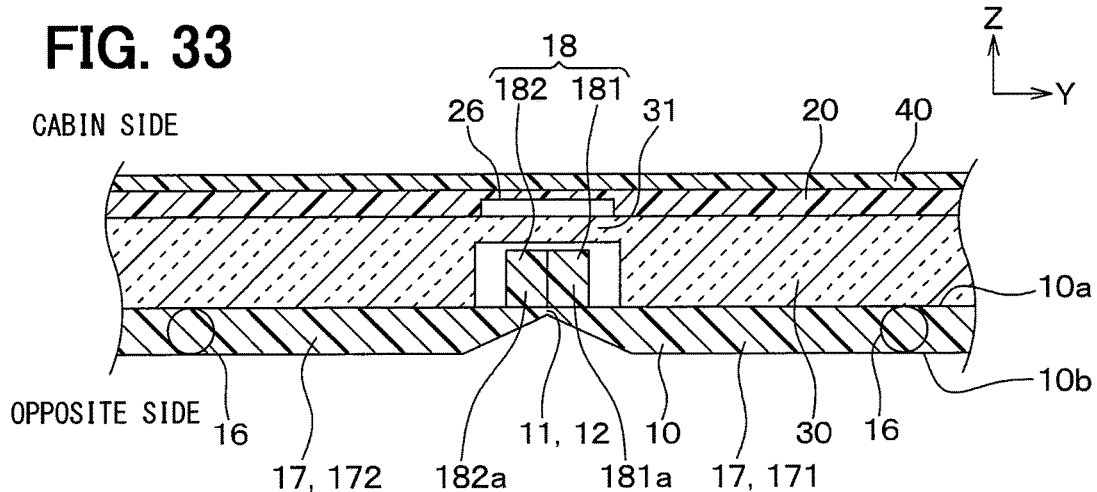

RADIANT HEATER APPARATUS

CROSS REFERENCE TO RELATED APPLICATIONS

The present application is a continuation application of International Patent Application No. PCT/JP2017/039799 filed on Nov. 2, 2017, which designated the United States and claims the benefit of priority from Japanese Patent Application No. 2016-246980 filed on Dec. 20, 2016. The entire disclosures of all of the above applications are incorporated herein by reference.

TECHNICAL FIELD

The present disclosure relates to a radiant heater apparatus.

BACKGROUND ART

A radiant heater apparatus includes a heater main body placed on a cabin side of an interior panel in a position that corresponds to a deployment direction of an airbag apparatus. The radiant heater apparatus also includes a cover layer placed on a cabin side of the heater main body.

SUMMARY

According to an aspect of the present disclosure, a radiant heater apparatus may be installed in a vehicle provided with an airbag apparatus to emit radiant heat toward an occupant in a cabin of the vehicle. The radiant heater apparatus includes an interior panel, a heater main body, and a cover layer. The interior panel includes a deployment portion to be deployed to the cabin side due to the deployment of the airbag apparatus. The deployment portion includes a breaking edge where a panel tear portion breaks when the airbag apparatus is deployed. The panel tear portion includes: a centerline portion that extends in one direction from one side to another side of the one direction; and a pair of sideline portion, each of the sideline portions extending in a direction that intersects with the centerline portion at or near a corresponding end of the centerline portion. The deployment portion includes the breaking edge formed along the centerline portion or the sideline portions. The deployment portion has a stress concentration portion that locally applies stress to the cover layer while at least a part of the breaking edge formed along the centerline portion is not in contact with the cover layer, when the deployment portion is deployed and comes into contact with the cover layer.

BRIEF DESCRIPTION OF DRAWINGS

FIG. 31 is a sectional view of the radiant heater apparatus according to the seventh embodiment in a state observed when the airbag is being deployed.

FIG. 32 is a sectional view of the radiant heater apparatus according to the first comparative example in a state observed when the airbag is being deployed.

FIG. 33 is a sectional view of a radiant heater apparatus according to an eighth embodiment.

DETAILED DESCRIPTION

Figure 1:
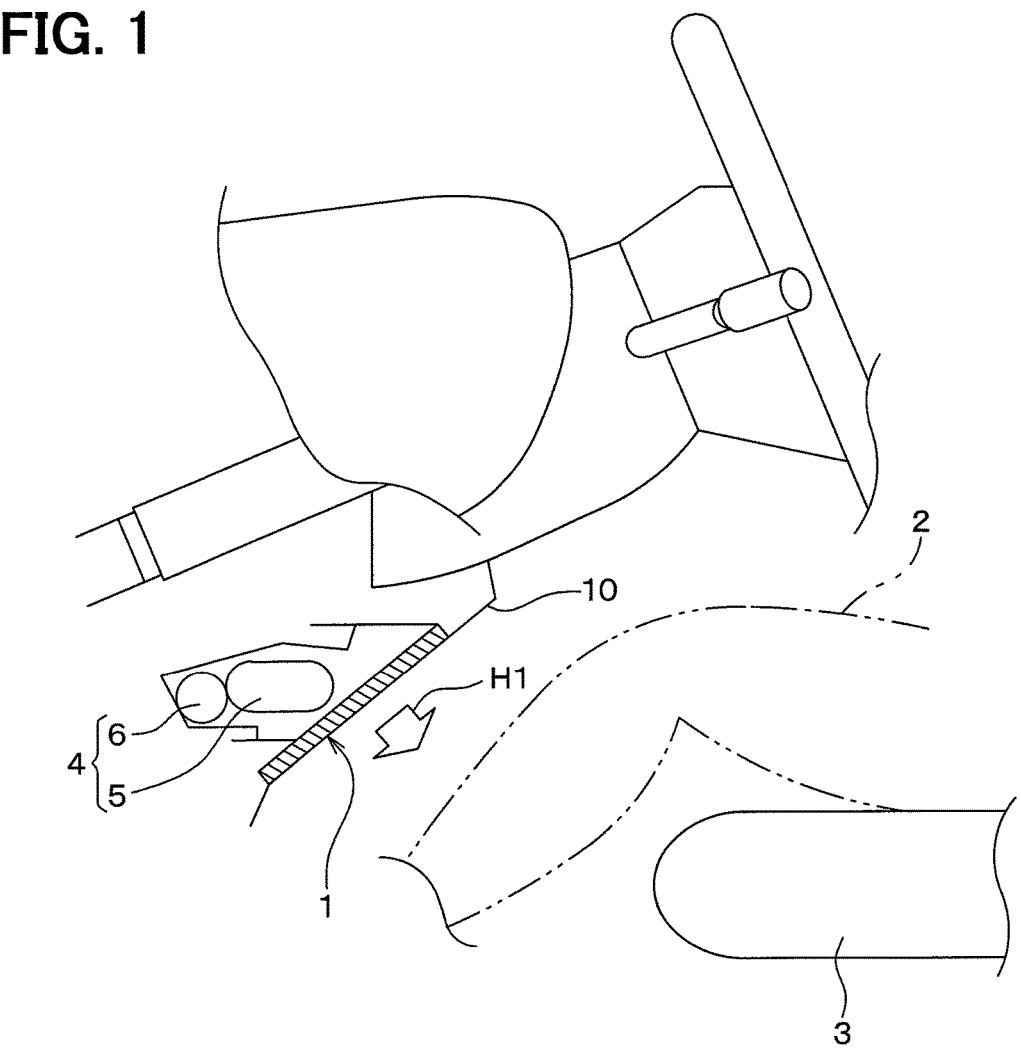
FIG. 1 is a sectional view of a cabin in which a radiant heater apparatus according to a first embodiment is placed.

The present disclosure provides a radiant heater apparatus that can cause, when an airbag apparatus is deployed, a cover layer to break so as not to inhibit the deployment of the airbag apparatus even without providing a tear portion in the cover layer.

According to an aspect of the present disclosure, a radiant heater apparatus may be installed in a vehicle provided with an airbag apparatus to emit radiant heat toward an occupant in a cabin of the vehicle. The radiant heater apparatus includes: an interior panel placed on a cabin side of the airbag apparatus; a heater main body placed on the cabin side of the interior panel and shaped in a sheet to generate and emit radiant heat; and a cover layer placed on the cabin side of the heater main body to cover the heater main body. The interior panel includes a deployment portion to be deployed to the cabin side due to the deployment of the airbag apparatus. The deployment portion includes a breaking edge that causes a panel tear portion to break when the airbag apparatus is deployed. The panel tear portion includes: a centerline portion that extends in one direction from one side to another side of the one direction; and a pair of sideline portions, each of the sideline portions extending in a direction that intersects with the centerline portion at or near a corresponding end of the centerline portion. The deployment portion includes the breaking edge formed along the centerline portion or the sideline portions. The interior panel is configured, when the deployment portion is deployed and comes into contact with the cover layer, the deployment portion has a stress concentration portion that locally applies stress to the cover layer while at least a part of the breaking edge formed along the centerline portion is not in contact with the cover layer.

The aspect of the radiant heater apparatus causes the interior panel to break at the panel tear portion when the airbag apparatus is deployed. The deployment portion of the interior panel can thus be deployed. The breaking edge of the deployment portion that is formed along the centerline portion comes into contact with the cover layer. At the time of the contact, the stress concentration portion applies stress locally to the cover layer, thereby facilitating the cover layer breaking. Thus, when the airbag apparatus is deployed, the cover layer can be broken so as not to inhibit the deployment of the airbag apparatus even without providing a tear portion in the cover layer.

In a comparative example, an interior panel includes a tear portion that is caused to break when an airbag apparatus is deployed, so as not to inhibit the deployment of the airbag apparatus. Further, a heater main body and a cover layer of a radiant heater apparatus also include tear portions. Each of the tear portions is composed of a thin portion having a thickness smaller than those in other regions. However, providing a tear portion in the cover layer requires a process of forming the tear portion when the cover layer is fabricated. Additionally, when the cover layer is configured by using a thin layer of fiber, such as woven fabric and knitted fabric, providing a tear portion may fray the fabric.

It is therefore desired that, when the airbag apparatus is deployed, the cover layer be caused to break so as not to inhibit the deployment of the airbag apparatus even without providing a tear portion in the cover layer.

Hereinafter, embodiments will be described according to the drawings. Same or equivalent portions among respective embodiments below are labeled with same reference numerals in the drawings.

First Embodiment

As shown in FIG. 1, the radiant heater apparatus 1 of the present embodiment is used as a heater for a cabin inside a vehicle travelling on a road.

A seat 3 is placed in the cabin for an occupant 2 to sit in. An interior panel 10 is placed in the cabin, forward of the seat 3 with respect to the vehicle. The interior panel 10 corresponds to an instrument panel that is placed in a forward position in the cabin. The instrument panel as used herein includes not only a portion in which instruments are placed but also a portion in which an audio unit and an air conditioner are housed.

An airbag apparatus 4 is placed inside the interior panel 10. In other words, the airbag apparatus 4 is placed on a cabin-space opposite side, which is the opposite side of the cabin, of the interior panel 10. The airbag apparatus 4 includes an airbag 5 and an inflator 6. The inflator 6 is a device for injecting gas into the airbag 5.

The radiant heater apparatus 1 is placed on a lower portion of the interior panel 10. The radiant heater apparatus 1 is placed between the seat 3 and the airbag apparatus 4, that is, on the cabin side of the airbag apparatus 4. The radiant heater apparatus 1 is placed in a deployment direction of the airbag apparatus 4. In other words, the radiant heater apparatus 1 is placed in a position that covers the airbag apparatus 4. The radiant heater apparatus 1 emits radiant heat H1 toward the legs of the occupant 2, particularly from the knees to shins of the occupant 2.

Figure 2:
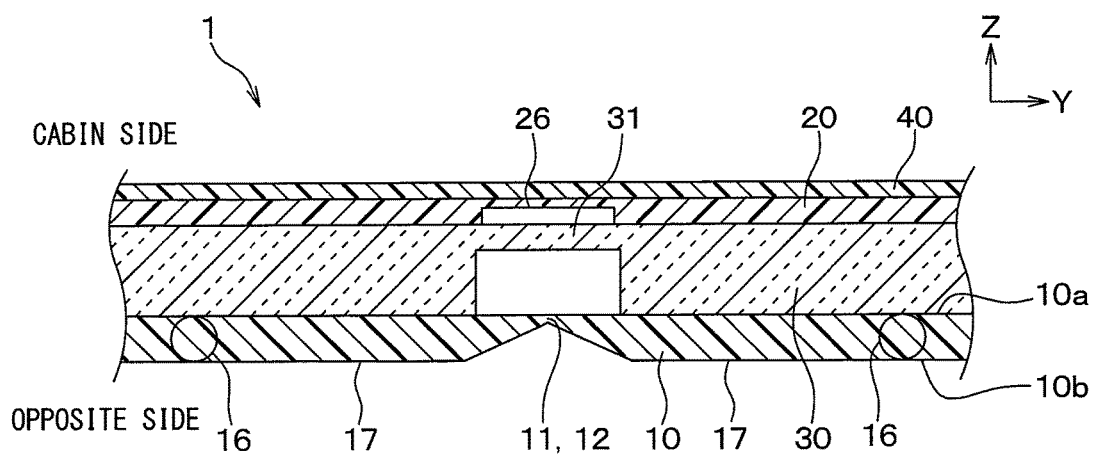
FIG. 2 is a sectional view of the radiant heater apparatus illustrated in FIG.

As illustrated in FIG. 2, the radiant heater apparatus 1 includes the interior panel 10, a heater main body 20, a heat insulation layer 30, and a cover layer 40.

The interior panel 10 has a front surface 10a, located on the cabin space side, and a back surface 10b, located on the cabin-space opposite side. The interior panel 10 included in the radiant heater apparatus 1 is all or a portion of the interior panel 10 placed in the forward position in the cabin.

The heater main body 20 is placed on the cabin side of the interior panel 10. The heater main body 20 has a planar shape, i.e., sheet-like shape. When energized, the heater main body 20 generates heat and emits radiant heat. The heater main body 20 is configured to produce an effect of, when the occupant 2 touches the radiant heater apparatus 1, rapidly lowering the temperature of a portion that is in contact with the occupant 2. The specific configuration is described below.

The heat insulation layer 30 is placed between the heater main body 20 and the interior panel 10. Specifically, the heat insulation layer 30 is placed on the cabin-space opposite side of the heater main body 20 and on the cabin side of the interior panel 10. The heat insulation layer 30 inhibits transfer of heat from the heater main body 20 to the cabin-space opposite side.

The cover layer 40 is placed on the cabin side of the heater main body 20. The cover layer 40 covers a surface of the heater main body 20. The cover layer 40 improves the appearance of the radiant heater apparatus 1. The cover layer 40 is composed of a thin layer of woven fabric or knitted fabric. The cover layer 40 is thinner than the heater main body 20 in the present embodiment.

A specific structure of the heater main body 20 is described next.

Figure 3:
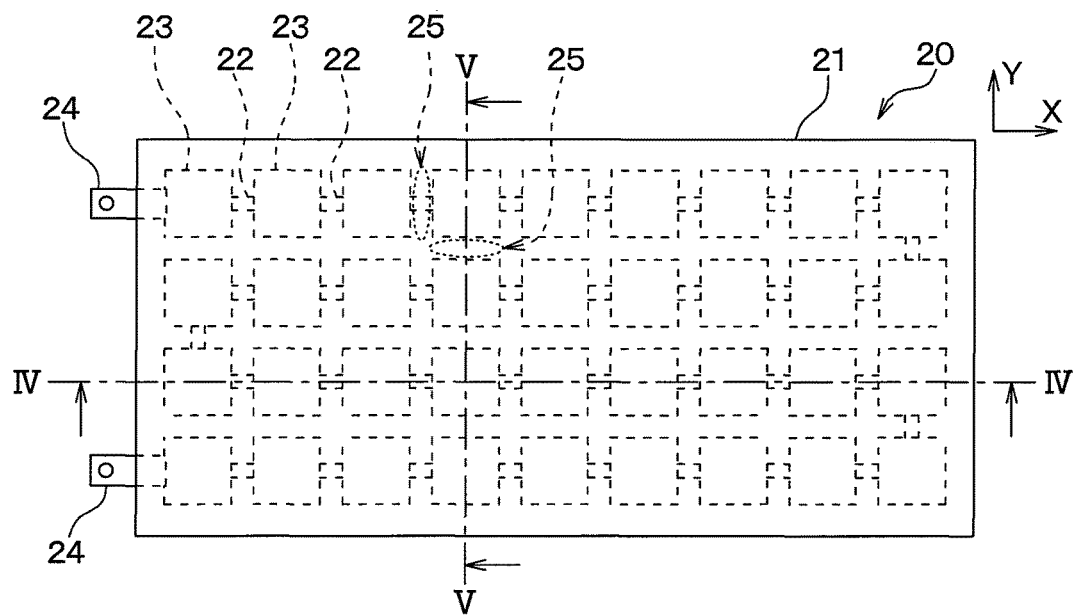
FIG. 3 is a plan view of a heater main body illustrated in FIG. 2.
Figure 4:
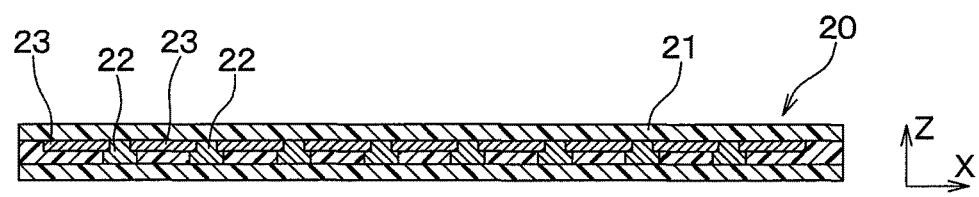
FIG. 4 is a sectional view taken along line IV-IV in FIG. 3.

As illustrated in FIG. 3, the heater main body 20 extends in both of an X direction and a Y direction. The planar shape of the heater main body 20 is substantially rectangular. As illustrated in FIG. 4, the heater main body 20 has a thickness in a Z direction. The heater main body 20 is also referred to as a planar heater that emits the radiant heat H1 mainly in a direction perpendicular to a surface thereof. The X direction, Y direction, and Z direction indicated with arrows in the figures are orthogonal to each other. The X direction and the Y direction are parallel to the surface of the heater main body 20, that is, they are in plane directions of the heater main body 20. The Z direction is perpendicular to the surface of the heater main body 20, that is, it is in a thickness direction of the heater main body 20.

As illustrated in FIGS. 3 and 4, the heater main body 20 includes a board 21, plural heat generators 22, plural heat emitters 23, and a pair of terminals 24.

The board 21 constitutes the outer shape of the heater main body 20. The heat generators 22 and the heat emitters 23 are placed inside the board 21. The board 21 supports the heat generators 22 and the heat emitters 23. The board 21 is composed of synthetic resin. The synthetic resin is, for example, thermoplastic resin.

The heat generators 22 and the heat emitters 23 are arranged with the heat generators 22 alternating with the heat emitters 23. The heat generator 22 and the heat emitter 23 that are adjacent to each other are connected. The heat generators 22 and the heat emitters 23 form a continuous current path between the terminals 24.

The heat generator 22 generates heat when energized. The heat generator 22 supplies heat to the adjacent heat emitter 23. The heat generator 22 is composed of a metal material.

The heat emitter 23 emits the radiant heat H1 due to the heat supplied from the adjacent heat generator 22. The heat emitter 23 is composed of a metal material having electric resistance smaller than that of the metal material of the heat generator 22.

The heat emitter 23 has a film-like shape. The heat generator 22 has a volume equal to or smaller than that of the heat emitter 23. Thus, the heat generator 22 and the heat emitter 23 each have a small volume and a small heat capacity.

As illustrated in FIG. 3, a low heat conductor 25 is present between the heat emitters 23 that are adjacent to each other. The low heat conductor 25 is a portion having thermal conductivity lower than that of the heat emitter 23. The low heat conductor 25 thermally separates the adjacent heat emitters 23. The low heat conductor 25 is configured by using the material of the board 21.

Figure 5:
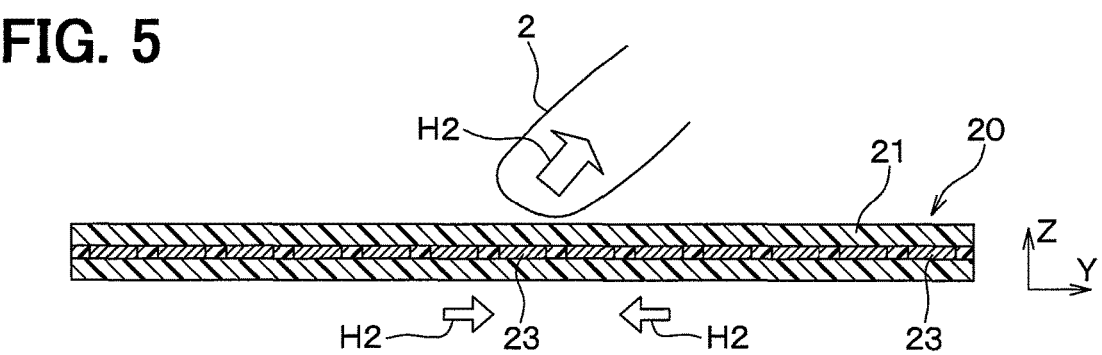
FIG. 5 is a sectional view of the heater main body illustrated in FIG. 4 for describing heat transfer occurring when an occupant touches the surface.

As illustrated in FIG. 5, an object or a finger of the occupant 2 may touch the surface of the heater main body 20 where a specific heat emitter 23 is located. Heat H2 of the specific heat emitter 23 is quickly transferred to the object in this case. The low heat conductor 25 inhibits the heat H2 from being transferred by thermal conduction from a portion surrounding the specific heat emitter 23 to the specific heat emitter 23. As a result, the temperature of the specific heat emitter 23 drops rapidly. The temperature of the surface of the heater main body 20 corresponding to the portion that is in contact with the object quickly drops. As described above, the heater main body 20 is configured to produce an effect of, when the occupant 2 touches the heater main body 20, rapidly lowering the temperature of the portion that is in contact with the occupant 2.

As illustrated in FIG. 2, the interior panel 10 includes a panel tear portion 11. The panel tear portion 11 is hereinafter referred to simply as the tear portion 11. The tear portion 11 has mechanical strength lower than that of the other portion surrounding the tear portion 11 for controlling breaking of the interior panel 10 when the airbag 5 of the airbag apparatus 4 is deployed. In other words, the tear portion 11 is caused to break at an early point in time when the airbag is deployed. When the tear portion 11 breaks, breaking edges are formed.

The tear portion 11 is composed of a thin material portion having a thickness smaller than that of the other portion of the interior panel 10 that surrounds the tear portion 11 in the present embodiment. The thin material portion is provided by forming a groove in the back surface 10b. Thus, the tear portion 11 is visually recognizable from the back surface 10b of the interior panel 10.

Figure 6:
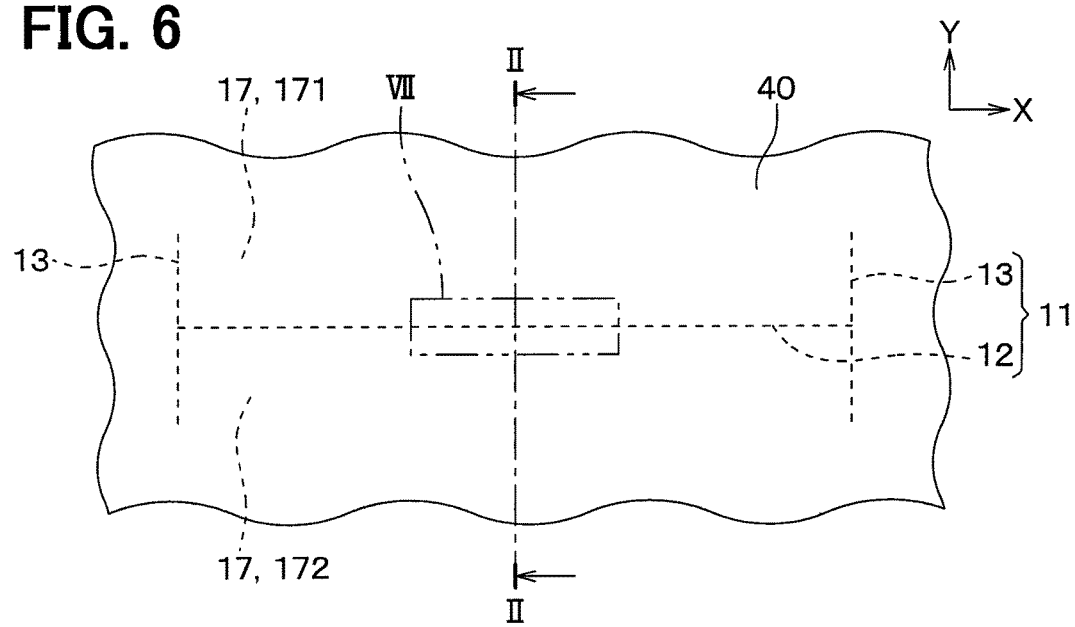
FIG. 6 is a plan view of the radiant heater apparatus in FIG. 1, illustrating the layout of a panel tear portion in a plan view.

As illustrated in FIG. 6, the tear portion 11 includes a centerline portion 12 and a pair of sideline portions 13. As the centerline portion 12, the thin material portion extends in a continuous line-like fashion in an X-Y plane direction. As each of the sideline portions 13, the thin material portion also extends in a continuous line-like fashion in an X-Y plane direction. X direction, Y direction, and Z direction indicated with arrows in FIG. 6 correspond to X direction, Y direction, and Z direction indicated with the arrows in FIG. 3, respectively. X direction and Y direction in FIG. 6 may indicate directions different from X direction and Y direction in FIG. 3 as long as X direction and Y direction in FIG. 6 are perpendicular to Z direction.

The centerline portion 12 extends in one direction from one side to the other side thereof. In FIG. 6, the X direction corresponds to the one direction. Each of the sideline portions 13 intersects with the centerline portion 12 at a corresponding end of the centerline portion 12. Each of the sideline portions 13 extends in a direction that intersects with the centerline portion 12. In FIG. 6, the Y direction corresponds to the direction that intersects with the centerline portion 12. Each of the sideline portions 13 has a point of intersection 13a with the centerline portion 12 at a location closer to the middle of a corresponding one of the sideline portions 13 than to ends 13b and 13c of the corresponding one of the sideline portions 13.

Figure 7:
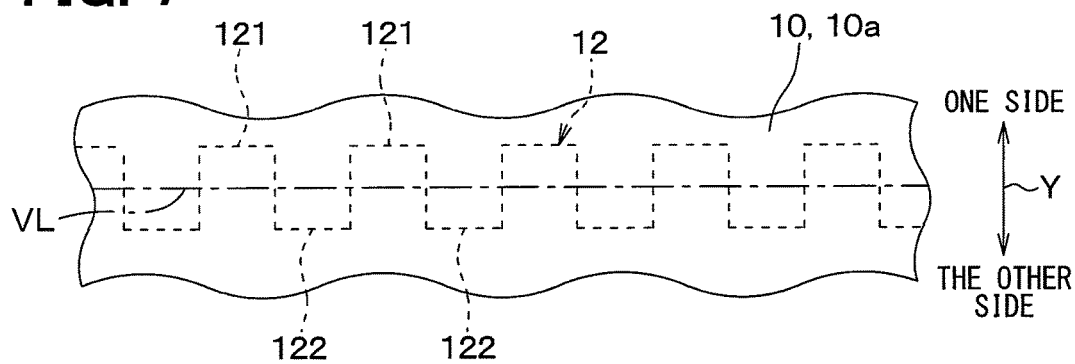
FIG. 7 is a plan view of an interior panel according to the present embodiment in a state observed before an airbag is deployed.
Figure 8:
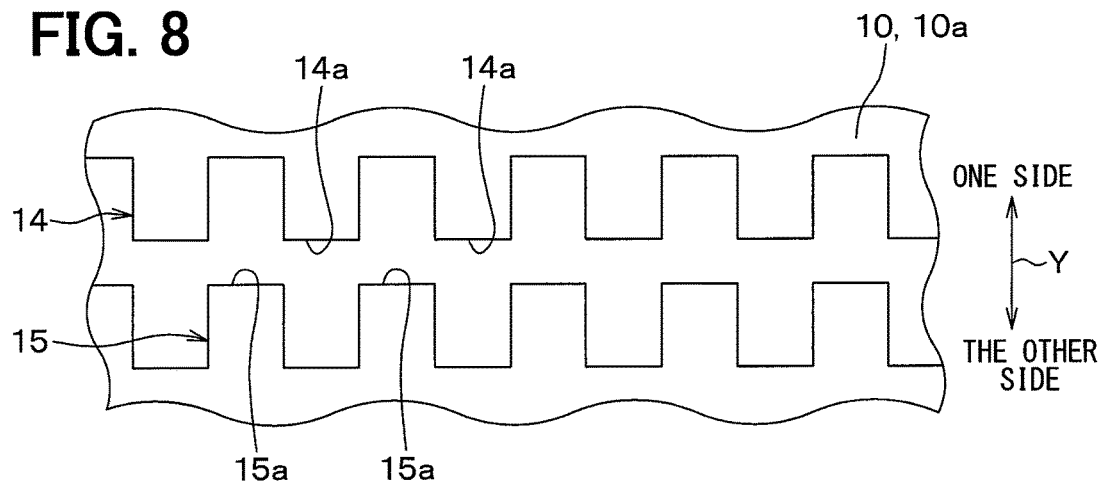
FIG. 8 is a plan view of the interior panel according to the present embodiment in a state observed when the airbag is being deployed.

FIGS. 7 and 8 are diagrams of the front surface 10a of the interior panel 10. In FIG. 7, a state observed before the deployment of the airbag 5 is illustrated. The centerline portion 12 illustrated in FIG. 7 corresponds to a location of the tear portion 11 that is the thinnest in FIG. 2. In FIG. 8, a state observed when the airbag 5 is being deployed is illustrated.

As illustrated in FIG. 7, the centerline portion 12 is formed like a line that has protrusions 121 and 122. Specifically, the thin material portion of the centerline portion 12 is placed in a line-like shape, in which the protrusions 121 and 122 are placed continuously with the protrusions 121 alternating with the protrusions 122, the orientations of the protrusions 121 and 122 opposite to each other.

The first protrusions 121 are positioned on one side of an imaginary straight line VL in the Y direction. The Y direction is perpendicular to the imaginary straight line VL. The first protrusions 121 each have a top located on the one side in the Y direction. Thus, the first protrusions 121 face the one side in the Y direction. The second protrusions 122 are positioned on the other side of the imaginary straight line VL in the Y direction. The second protrusions 122 each have a top located on the other side in the Y direction. Thus, the second protrusions 122 face the other side in the Y direction. The orientation of the first protrusions 121 is opposite to that of the second protrusions 122.

When the airbag 5 is deployed, the interior panel 10 is torn along the tear portion 11, and a pair of breaking edges 14 and 15 are formed in the interior panel 10. The shapes of the breaking edges are in the shape along the tear portion 11.

As illustrated in FIG. 8, when the centerline portion 12 breaks, the breaking edge 14 has protrusions 14a, and the breaking edge 15 has protrusions 15a. The protrusions 14a of the breaking edge 14 are formed due to the protrusions 122, which are positioned on the other side, out of the protrusions 121 and 122 of the centerline portion 12. The protrusions 15a of the breaking edge 15 are formed due to the protrusions 121, which are positioned on the one side, out of the protrusions 121 and 122 of the centerline portion 12.

As illustrated in FIG. 7, each of the protrusions 121 and 122 of the centerline portion 12 has a rectangular shape where each of the protrusions has a flat top and a constant width. Accordingly, as illustrated in FIG. 8, each of the protrusions 14a and 15a of the breaking edges 14 and 15 has a rectangular shape.

Each of the sideline portions 13 is formed like a straight line as illustrated in FIG. 6. Accordingly, the breaking edges that are formed when the airbag 5 is deployed and causes the sideline portions 13 to break each have a straight line shape.

As illustrated in FIG. 2, the interior panel 10 includes a hinge 16 for the interior panel 10 to bend when the airbag 5 is deployed.

The interior panel 10 includes a deployment portion 17 that deploys about the hinges 16, each of which serves as an axis, when the airbag 5 is deployed. As illustrated in FIGS. 2 and 6, the deployment portion 17 is surrounded by the tear portion 11. More specifically, the deployment portion 17 is surrounded by the hinges 16, centerline portion 12, and sideline portions 13 of the interior panel 10.

In other words, the deployment portion 17 includes the breaking edges 14 and 15 formed along the centerline portion 12 and formed along the sideline portions 13. The deployment portion 17 includes a first deployment portion 171 and a second deployment portion 172 on opposite sides of the centerline portion 12. Hereinafter, the first deployment portion 171 and the second deployment portion 172 are referred to as a pair of deployment portions 17.

The deployment portions 17 each are configured separately from the other portion of the interior panel 10.

As illustrated in FIG. 2, the heater main body 20 includes a heater tear portion 26. The heat insulation layer 30 includes a heat insulation layer tear portion 31. The heater tear portion 26 and the heat insulation layer tear portion 31 are each composed of a thin material portion. The heater tear portion 26 and the heat insulation layer tear portion 31 are each placed in a straight line-like fashion in a region that corresponds to the centerline portion 12 and the sideline portions 13.

The cover layer 40 includes no tear portion in the present embodiment.

An operation of the radiant heater apparatus 1 according to the present embodiment performed when the airbag apparatus 4 is activated is described next.

Figure 9:
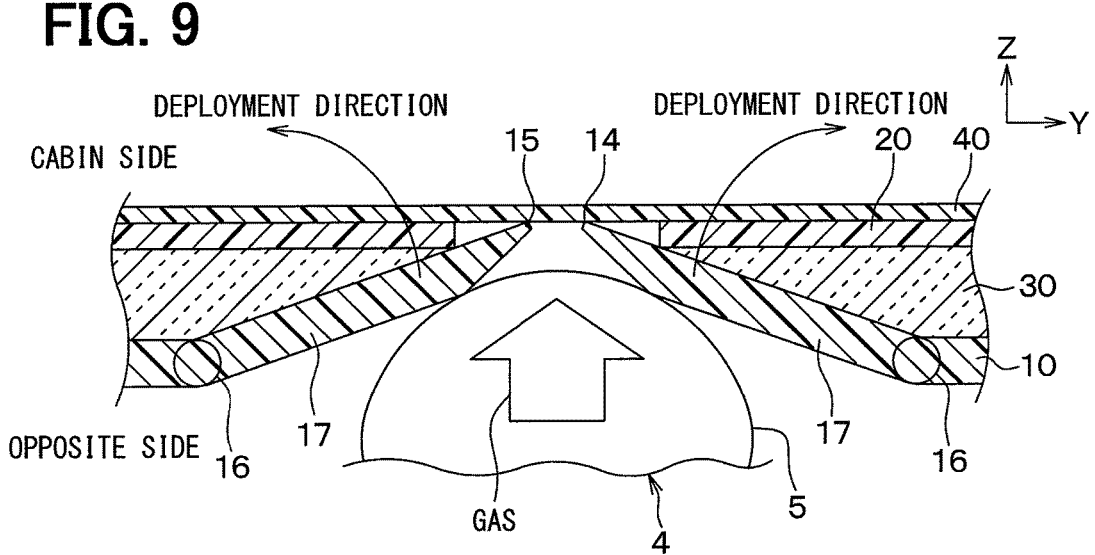
FIG. 9 is a sectional view of the radiant heater apparatus according to the first embodiment in a state observed when the airbag is being deployed.

When the airbag apparatus 4 is activated, the airbag 5 is deployed as illustrated in FIG. 9. The airbag 5 applies stress to the interior panel 10. The stress causes the interior panel 10 to break along the tear portion 11. The breaking edges 14 and 15 are thus formed in the interior panel 10.

As the airbag 5 is further deployed, the pair of deployment portions 17, which include the breaking edges 14 and 15, of the interior panel 10 are deployed about the hinges 16 to the cabin side. Stress due to the deployment of the pair of deployment portions 17 is applied to the heat insulation layer 30 and the heater main body 20. The stress causes the heat insulation layer 30 to break at the heat insulation layer tear portion 31 and the heater main body 20 to break at the heater tear portion 26. The breaking edges 14 and 15 of the pair of deployment portions 17 then come into contact with the cover layer 40.

Figure 10:
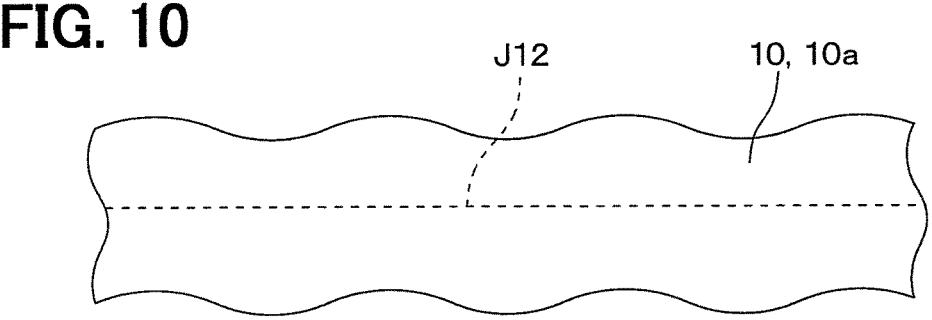
FIG. 10 is a plan view of an interior panel according to a first comparative example in a state observed before the airbag is deployed.
Figure 11:
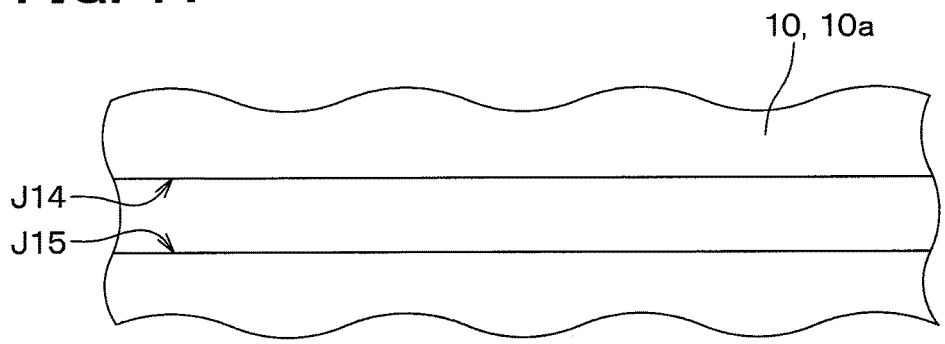
FIG. 11 is a plan view of the interior panel according to the first comparative example in a state observed when the airbag is being deployed.

Here, the present embodiment is compared to a first comparative example illustrated in FIG. 10. In the first comparative example, a centerline portion J12 is formed like a straight line. Accordingly, breaking edges J14 and J15 formed when the airbag 5 is deployed each have a straight line shape as illustrated in FIG. 11. Thus, when the breaking edges J14 and J15 come into contact with the cover layer 40, the entire regions of the breaking edges J14 and J15 make contact with the cover layer 40.

In contrast, in the present embodiment, the breaking edges 14 and 15 formed when the airbag 5 is deployed have the protrusions 14a and 15a, respectively, as illustrated in FIG. 8. Thus, when the breaking edges 14 and 15 come into contact with the cover layer 40, the protrusions 14a and 15a make contact with the cover layer 40. That is, it is not the entire regions of the breaking edges 14 and 15 but portions of the breaking edges 14 and 15 that come into contact with the cover layer 40. The other portions of the breaking edges 14 and 15 do not make contact with the cover layer 40.

The area of contact of the breaking edges 14 and 15 with the cover layer 40 in the present embodiment is smaller than that of the first comparative example. Stress is thus concentrated in portions of the cover layer 40 that are in contact with the protrusions 14a and 15a. The breaking edges 14 and 15 therefore cause the cover layer 40 to break with greater ease in the present embodiment than the first comparative example.

Figure 12:
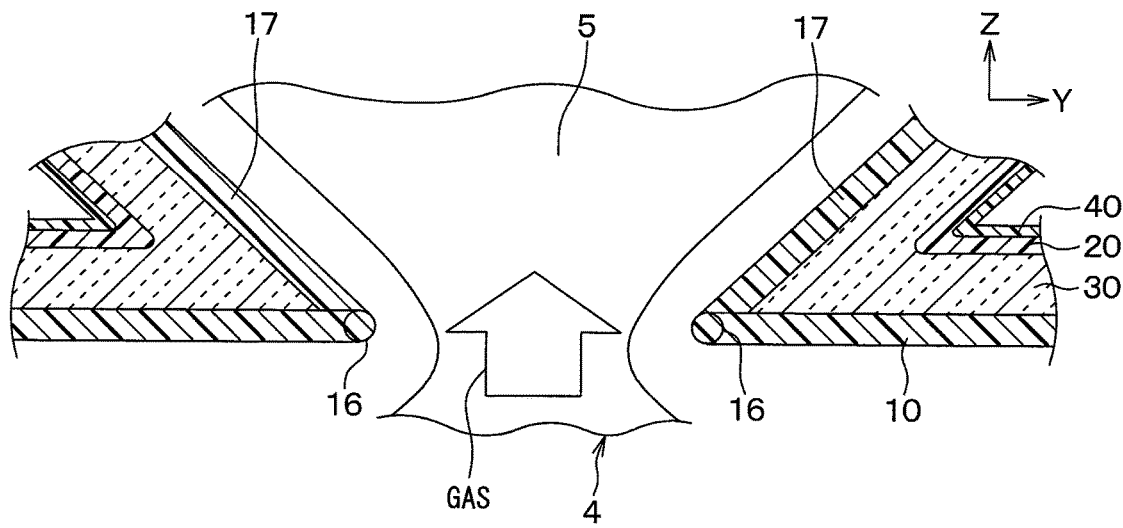
FIG. 12 is a sectional view of the radiant heater apparatus according to the first embodiment in a state observed after the airbag is deployed.

Since the breaking edges 14 and 15 cause the cover layer 40 to break, the airbag 5 can be deployed as illustrated in FIG. 12. In the present embodiment, the protrusions 14a and 15a of the breaking edges 14 and 15 correspond to a stress concentration portion that, when the deployment portion is deployed and comes into contact with the cover layer, makes local contact with the cover layer, thereby applying concentrated stress to the portions of the cover layer that are in contact with the stress concentration portion.

Advantages of the radiant heater apparatus 1 according to the present embodiment are described next.

The heater main body 20 is configured to produce an effect of, when the occupant 2 touches the heater main body 20, rapidly lowering the temperature of a portion that is in contact with the occupant 2. The cover layer 40 is composed of a thin layer of woven fabric or knitted fabric. The cover layer 40 thus has a small heat capacity. The effect produced by the heater main body 20 is thus not reduced. Use of woven fabric or knitted fabric for the cover layer 40 is not a limitation. The cover layer 40 may be composed of other fabric made from fibers than woven fabric and knitted fabric, as long as the effect of the heater main body 20 is not reduced.

When the cover layer 40 is composed of fabric, such as woven fabric and knitted fabric, as in the present embodiment, providing a tear portion in the cover layer 40 may fray the fabric. It is therefore desired that the cover layer 40 break with ease even without providing a tear portion in the cover layer 40, when the airbag 5 is deployed. In other words, there is a desire to be able to control how the cover layer 40 breaks when the airbag 5 is deployed.

To satisfy such desires, the centerline portion 12 of the tear portion 11 has a line-like shape that has the protrusions 121 and 122 in the present embodiment. In the line-like shape, the protrusions 121 and 122 are placed continuously with the protrusions 121 alternating with the protrusions 122, the orientations of the protrusions 121 and 122 opposite to each other. That is, the centerline portion 12 has a wavy line shape. Here, the shape of the centerline portion 12 is as observed when the back surface 10*b* of the interior panel 10 is viewed from the front of the back surface 10*b*.

The portions of the breaking edges 14 and 15 that are formed along the centerline portion 12 when the airbag 5 is deployed and causes the interior panel 10 to break can thus have shapes having the protrusions 14*a* and 15*a*, respectively. When the pair of deployment portions 17 apply stress to the cover layer 40, the stress can be concentrated in portions of the cover layer 40 that are in contact with the protrusions 14*a* and 15*a*. This enables the cover layer 40 to break at the portions in which stress is concentrated.

As described above, when the airbag apparatus 4 is deployed, the interior panel 10 breaks and locally applies stress to the cover layer 40, thereby facilitating the cover layer breaking in the present embodiment. The cover layer 40 can thus break stably even without providing a tear portion in the cover layer 40, when the airbag apparatus 4 is deployed.

In the present embodiment, no special processing is required on the cover layer 40 to cause the cover layer 40 to break when the airbag apparatus 4 is deployed. The cover layer 40 thus has an excellent appearance. Additionally, the fabrication of the cover layer 40 is facilitated.

Furthermore, the radiant heater apparatus 1 according to the present embodiment does not inhibit the deployment of the airbag apparatus 4. The radiant heater apparatus 1 can thus be placed also in a portion of the interior panel 10 where the airbag apparatus 4 is located as illustrated in FIG. 1. This can lead to an increased area of heat generation in comparison with a radiant heater apparatus that is positioned around the portion of the interior panel 10 where the airbag apparatus 4 is located. The amount of heat release toward the occupant 2 can thus be increased. More effective thermal comfort can thus be provided for the occupant 2.

Second Embodiment

The present embodiment is different from the first embodiment in the specific planar shape of a centerline portion 12. Other features of a radiant heater apparatus 1 are the same as those in the first embodiment.

Figure 13:
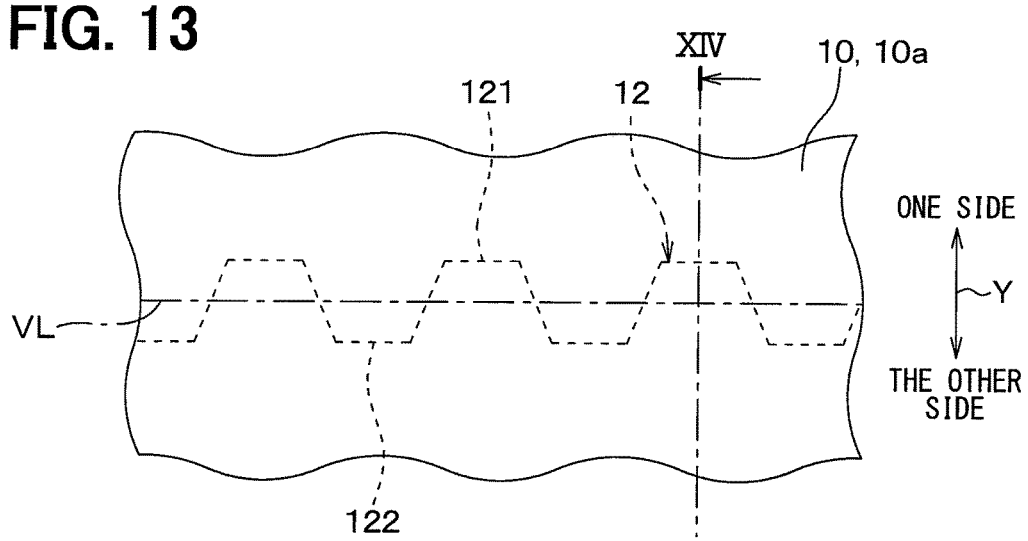
FIG. 13 is a plan view of an interior panel according to a second embodiment in a state observed before the airbag is deployed.
Figure 14:
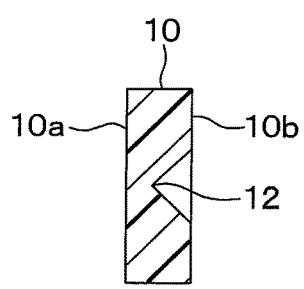
FIG. 14 is a sectional view taken along line XIV-XIV in FIG. 13.

As illustrated in FIGS. 13 and 14, the centerline portion 12 according to the present embodiment is also composed of a line-like thin material portion having protrusions 121 and 122 as in the first embodiment.

As illustrated in FIG. 13, the present embodiment is different from the first embodiment in that each of the protrusions 121 and 122 of the centerline portion 12 has a trapezoidal shape where each of the protrusions 121 and 122 has a flat top and a width that increases with distance from the top.

Figure 15:
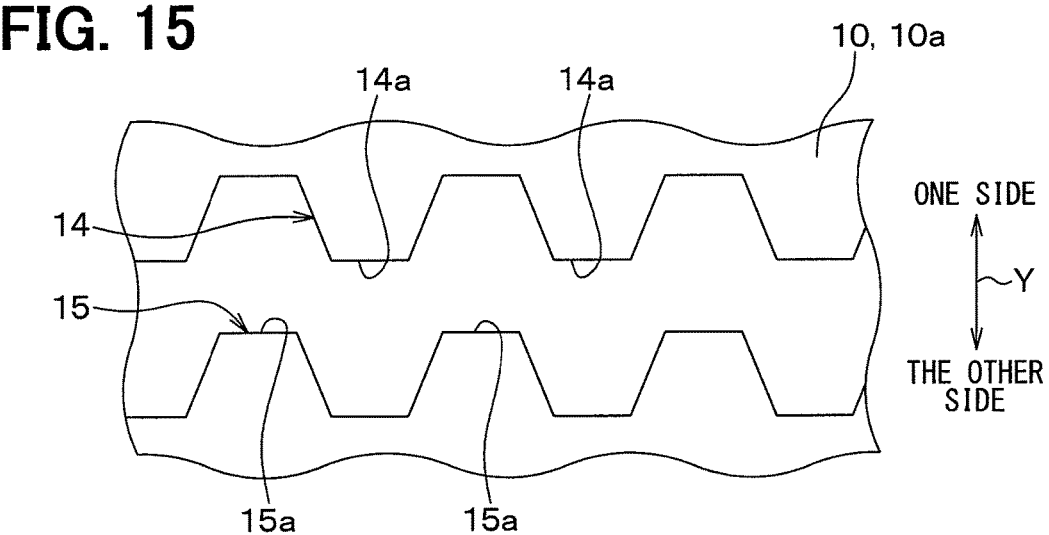
FIG. 15 is a plan view of the interior panel according to the second embodiment in a state observed when the airbag is being deployed.

Accordingly, as illustrated in FIG. 15, each of protrusions 14*a* and 15*a* of breaking edges 14 and 15 has a trapezoidal shape.

In the protrusions 14*a* and 15*a* according to the present embodiment, the top can be narrow and a side opposite to the top can be wide. The stress can thus be concentrated on a cover layer 40 effectively. Additionally, portions of the interior panel 10 outside of the centerline portion 12 can be prevented from cracking when the interior panel 10 breaks.

Third Embodiment

The present embodiment is different from the first embodiment in the specific planar shape of a centerline portion 12. Other features of a radiant heater apparatus 1 are the same as those in the first embodiment.

Figure 16:
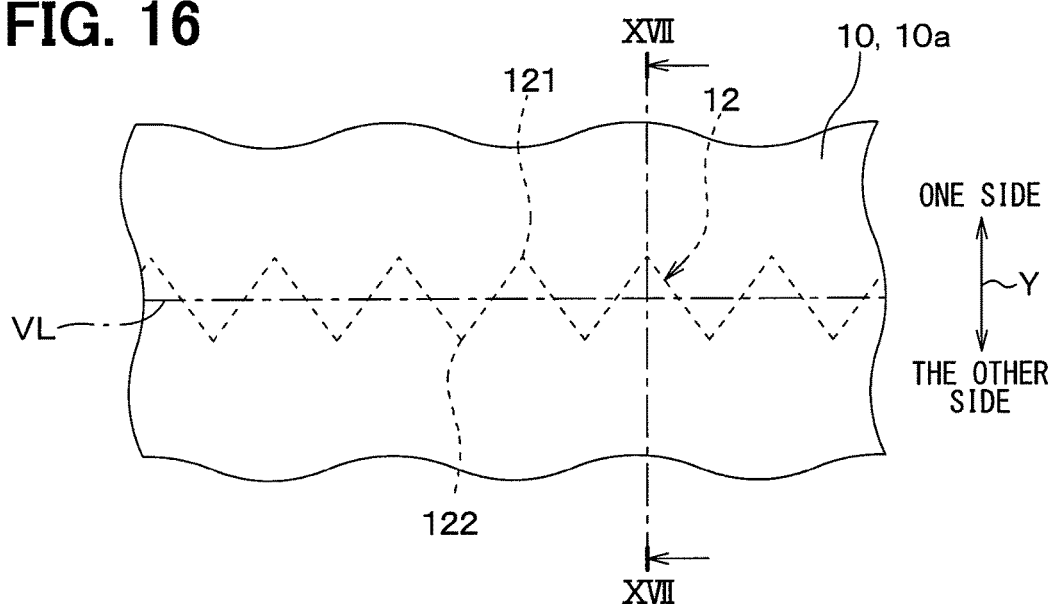
FIG. 16 is a plan view of an interior panel according to a third embodiment in a state observed before the airbag is deployed.
Figure 17:
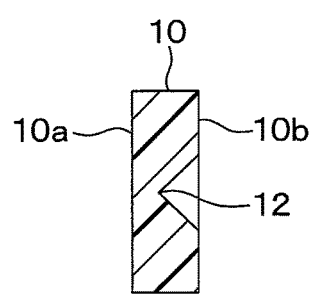
FIG. 17 is a sectional view taken along line XVII-XVII in FIG. 16.

As illustrated in FIGS. 16 and 17, the centerline portion 12 according to the present embodiment is also composed of a line-like thin material portion having protrusions 121 and 122 as in the first embodiment.

As illustrated in FIG. 16, the present embodiment is different from the first embodiment in that each of the protrusions 121 and 122 of the centerline portion 12 has a triangular shape where each of the protrusions 121 and 122 has a pointed top and a width that increases with distance from the top.

Figure 18:
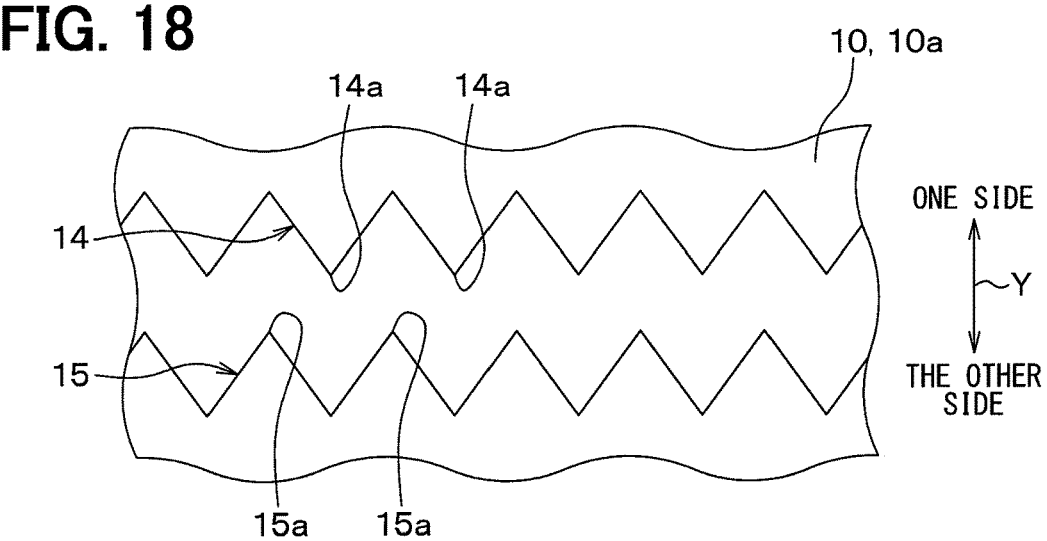
FIG. 18 is a plan view of the interior panel according to the third embodiment in a state observed when the airbag is being deployed.

Accordingly, as illustrated in FIG. 18, each of protrusions 14*a* and 15*a* of breaking edges 14 and 15 has a triangular shape.

Since the top of each of the protrusions 14*a* and 15*a* is pointed in the present embodiment, the stress can be concentrated on the cover layer 40 more effectively.

Fourth Embodiment

The present embodiment is different from the first embodiment in the specific planar shape of a centerline portion 12. Other features of a radiant heater apparatus 1 are the same as those in the first embodiment.

Figure 19:
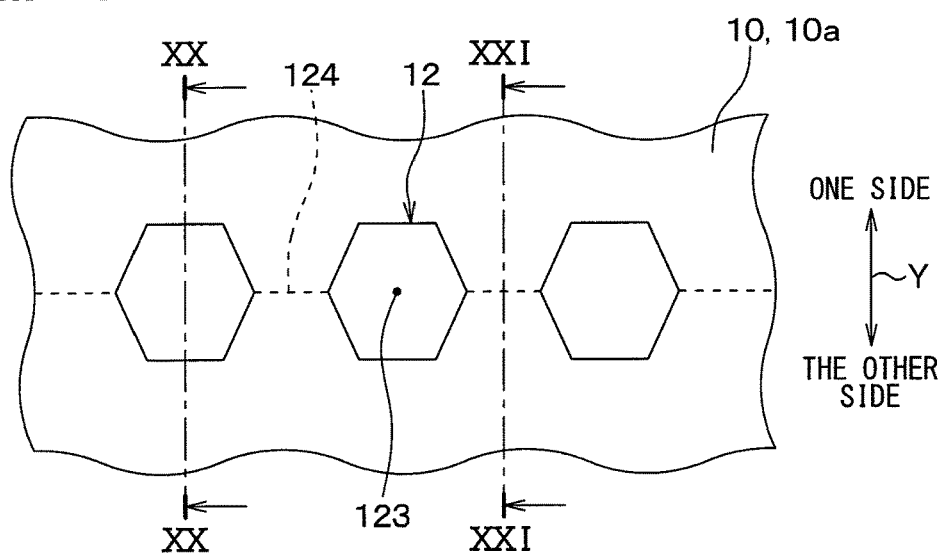
FIG. 19 is a plan view of an interior panel according to a fourth embodiment in a state observed before the airbag is deployed.

As illustrated in FIG. 19, the centerline portion 12 is configured by using a plurality of openings 123 and a plurality of thin material portions 124 in the present embodiment. The openings 123 are placed intermittently, apart from one another. Each of the openings 123 is in the shape of a hexagon. The thin material portions 124 refer to portions located between adjacent ones of the openings 123. The thin material portions each extend in a straight line-like fashion from one of the adjacent openings 123 to the other one thereof.

Figure 20:
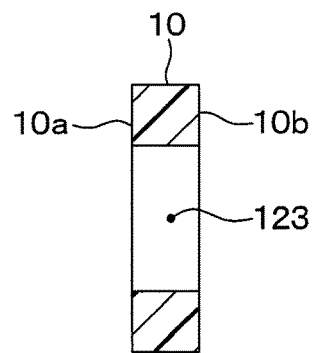
FIG. 20 is a sectional view taken along line XX-XX in FIG. 19.
Figure 21:
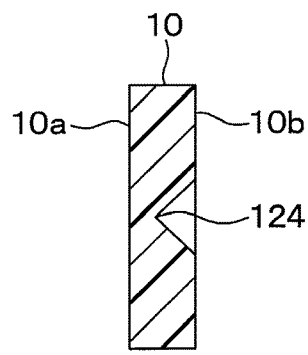
FIG. 21 is a sectional view taken along line XXI-XXI in FIG. 19.

As illustrated in FIG. 20, the openings 123 penetrate through the interior panel 10 from the front surface 10*a* to the back surface 10*b*. As illustrated in FIG. 21, the thin material portions 124 are each provided by forming a groove in the back surface 10*b* of the interior panel 10 and thus are thinner than other portions.

Figure 22:
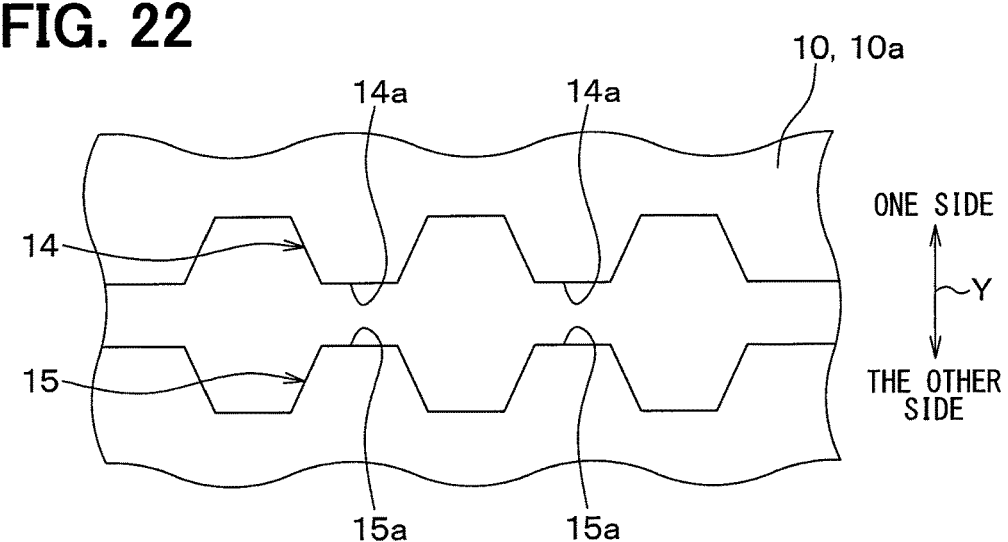
FIG. 22 is a plan view of the interior panel according to the fourth embodiment in a state observed when the airbag is being deployed.

As illustrated in FIG. 22, breaking edges 14 and 15 are in the shapes along opening edges of the openings 123 and the thin material portions 124. The breaking edges 14 and 15 thus have shapes that have protrusions 14*a* and 15*a*, respectively, also in the present embodiment. As described above, in the present embodiment, the openings 123 are placed such that when the thin material portions 124 of the centerline portion 12 are caused to break, the thin material portions 124 serve as the protrusions 14a and 15a. The present embodiment thus also produces similar effects to those of the first embodiment.

In the present embodiment, portions having significantly lowered strength can be provided by forming the openings 123 in the interior panel 10. This facilitates the interior panel 10 breaking when the airbag apparatus 4 is deployed.

The centerline portion 12 can be formed in the following manner in the present embodiment. A thin material portion 124 having a straight line shape is formed in advance in the interior panel 10 in regions of the interior panel 10 that include those for forming the openings 123. Then, a hole making process is performed to form the openings 123 in the regions of the interior panel 10 for forming the openings 123. As described above, according to the present embodiment, use of the hole making process can facilitate forming the centerline portion.

It is preferable in the present embodiment that the distance between the adjacent openings 123 be minimized. For example, the distance between the adjacent openings 123 is preferably shorter than a maximum opening width of each of the openings 123. In this way, a top of each of the protrusions 14a and 15a can be narrowed.

Fifth Embodiment

Figure 23:
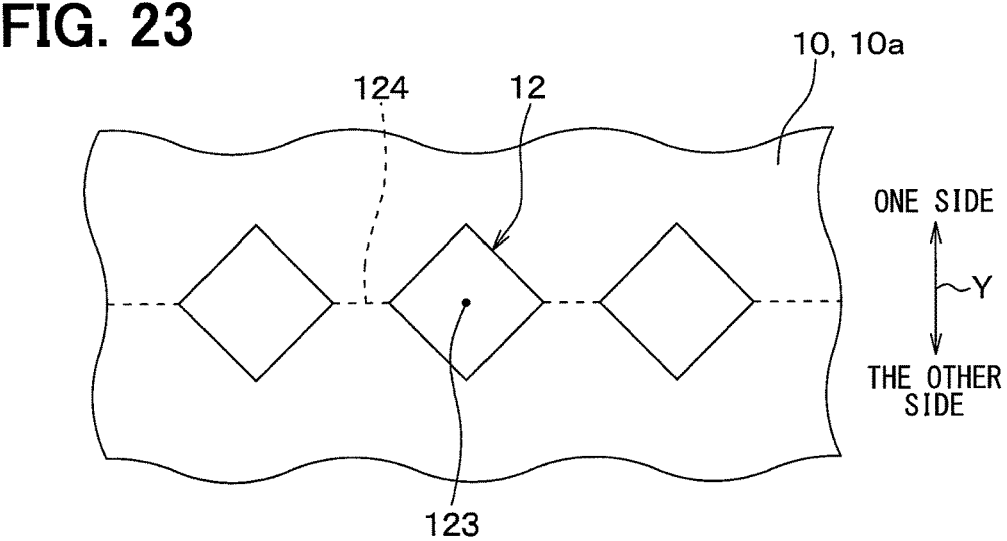
FIG. 23 is a plan view of an interior panel according to a fifth embodiment in a state observed before the airbag is deployed.

As illustrated in FIG. 23, the present embodiment is different from the fourth embodiment in that the planar shape of each of openings 123 configuring a centerline portion 12 is a quadrilateral. The quadrilateral may be any quadrilateral, such as a rhombus, a square, and a rectangle.

Figure 24:
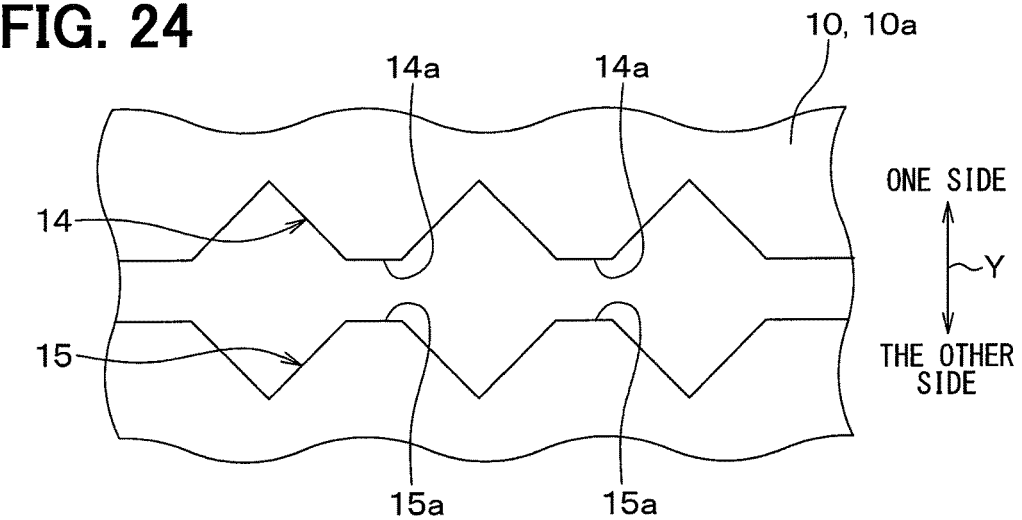
FIG. 24 is a plan view of the interior panel according to the fifth embodiment in a state observed when the airbag is being deployed.

As illustrated in FIG. 24, breaking edges 14 and 15 have shapes that have protrusions 14a and 15a, respectively. The present embodiment thus also produces similar effects to those of the fourth embodiment.

Sixth Embodiment

Figure 25:
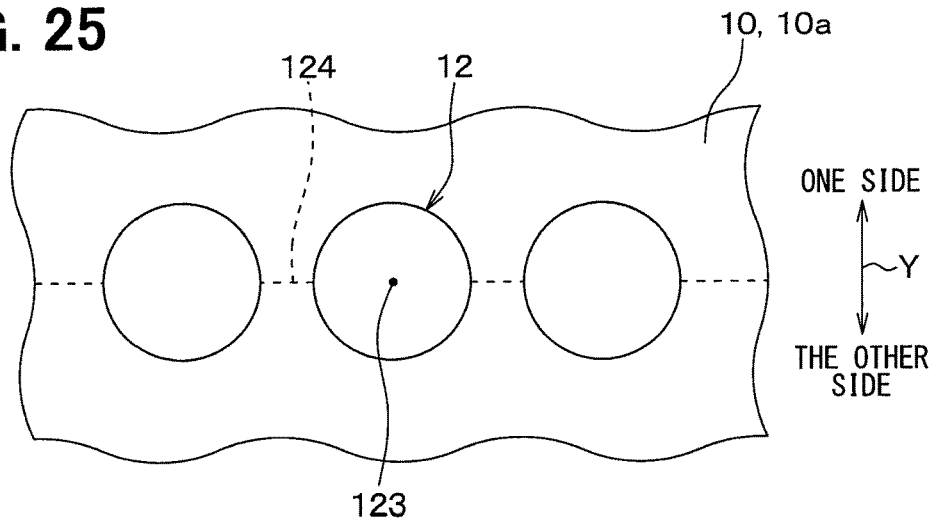
FIG. 25 is a plan view of an interior panel according to a sixth embodiment in a state observed before the airbag is deployed.

As illustrated in FIG. 25, the present embodiment is different from the fourth embodiment in that the planar shape of each of openings 123 configuring a centerline portion 12 is a circle. The circle may be any circle, such as a perfect circle and an ellipse.

Figure 26:
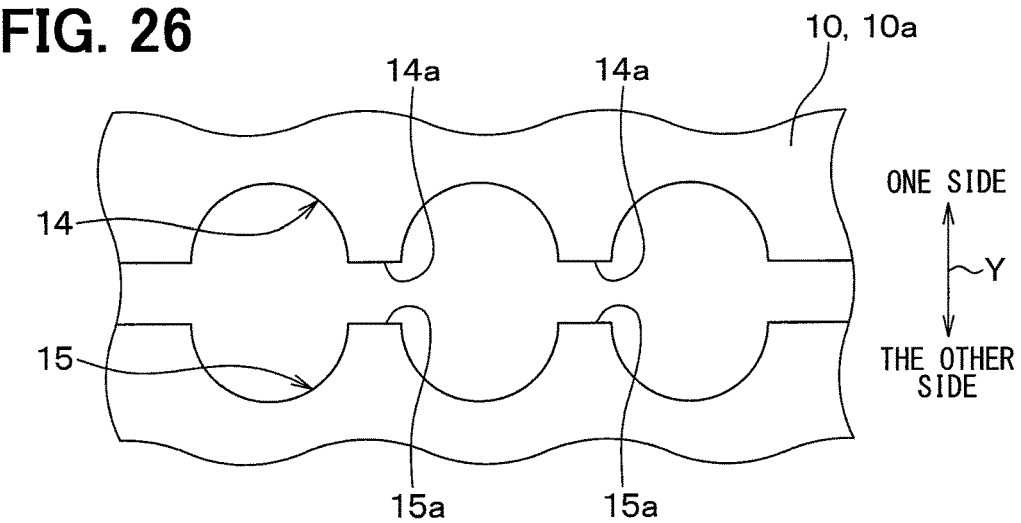
FIG. 26 is a plan view of the interior panel according to the sixth embodiment in a state observed when the airbag is being deployed.

As illustrated in FIG. 26, breaking edges 14 and 15 have shapes that have protrusions 14a and 15a, respectively. The present embodiment thus also produces similar effects to those of the fourth embodiment.

Seventh Embodiment

As illustrated in FIGS. 27, 28, 29, and 30, the present embodiment is different from the first embodiment in that an interior panel 10 includes a bulge 18 that serves as a stress concentration portion.

Figure 28:
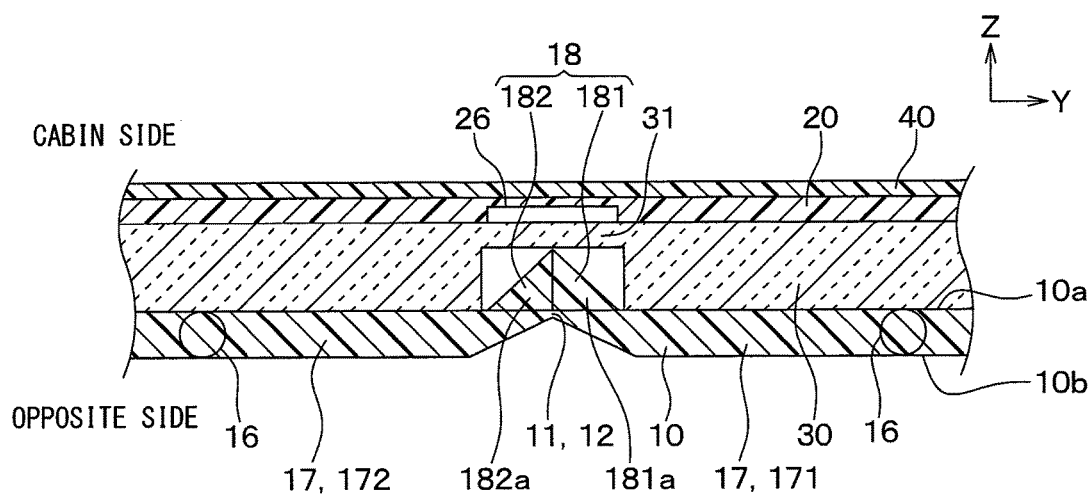
FIG. 28 is a sectional view taken along line XXVIII-XXVIII in FIG. 27.

As illustrated in FIG. 28, in a state observed before a tear portion 11 breaks, the bulge 18 is placed in a region of the interior panel 10 that is located near the tear portion 11. The bulge 18 extends toward a cover layer 40. The bulge 18 has a triangular cross section. The bulge 18 has a sharp tip end.

Figure 29:
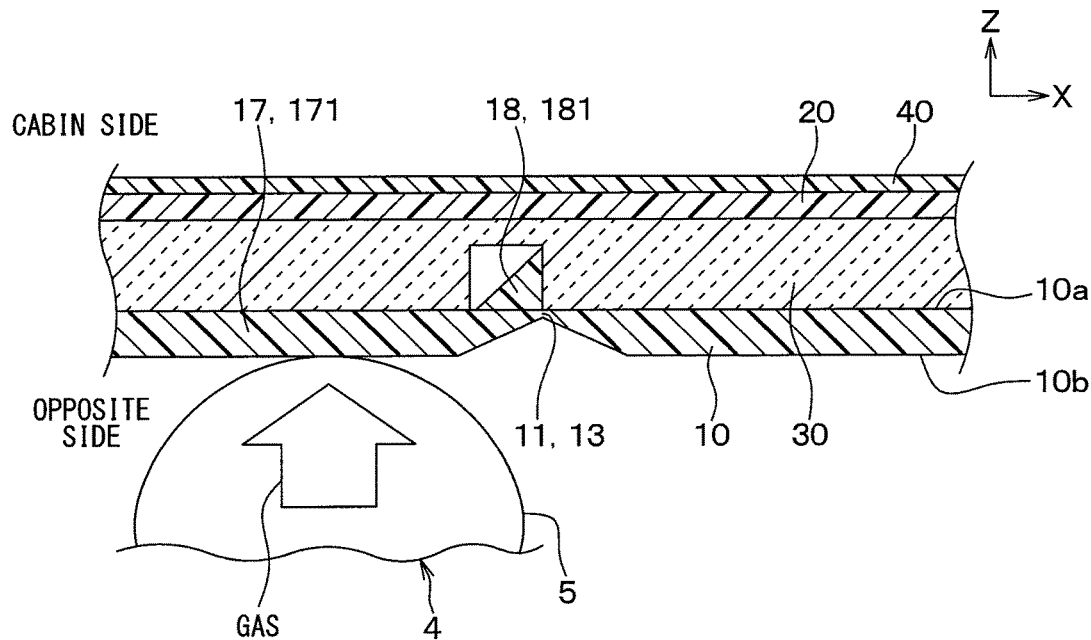
FIG. 29 is a sectional view taken along line XXIX-XXIX in FIG. 27.

As illustrated in FIGS. 28 and 29, the bulge 18 is placed in a portion of the interior panel 10 in which a pair of deployment portions 17 are located. Specifically, the bulge 18 includes a first bulge 181 and a second bulge 182. The first bulge 181 is placed in a portion of the interior panel 10 in which a first deployment portion 171 is located. The first bulge 181 is a portion of the first deployment portion 171. The second bulge 182 is placed in a portion of the interior panel 10 in which a second deployment portion 172 is located. The second bulge 182 is a portion of the second deployment portion 172.

Figure 27:
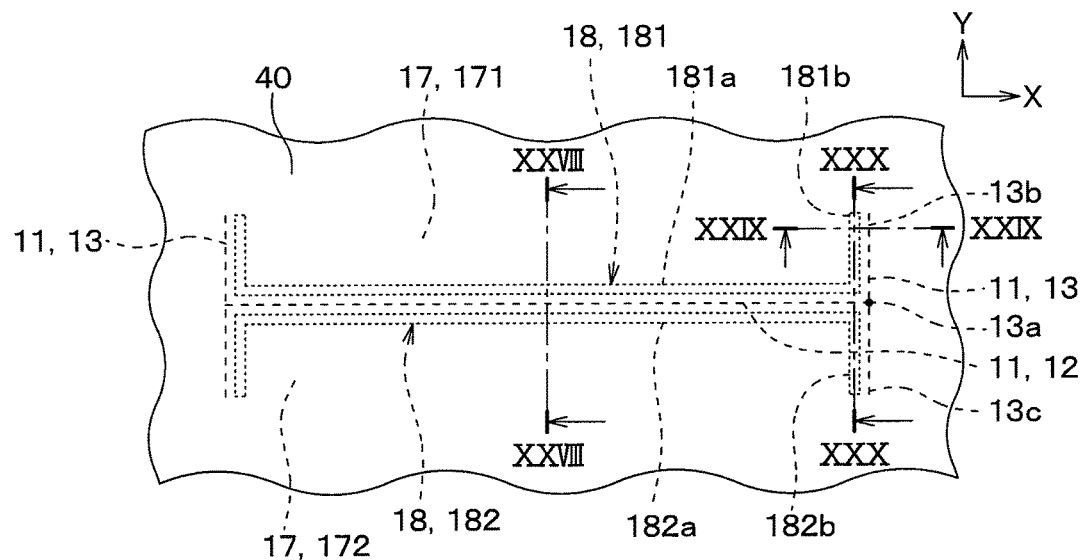
FIG. 27 is a plan view of a radiant heater apparatus according to a seventh embodiment.

As illustrated in FIG. 27, the first bulge 181 includes: a first center bulge 181a placed in a line-like fashion along a centerline portion 12; and a first side bulge 181b placed in a line-like fashion along each of sideline portions 13. The second bulge 182 similarly includes: a second center bulge 182a placed in a line-like fashion along the centerline portion 12; and a second side bulge 182b placed in a line-like fashion along each of the sideline portions 13. The bulge 18 has consistent heights in the first center bulge 181a and the second center bulge 182a. In the present embodiment, the centerline portion 12 is formed like a straight line as with the centerline portion J12 of the first comparative example illustrated in FIG. 10. Each of the sideline portions 13 is also formed like a straight line.

Figure 30:
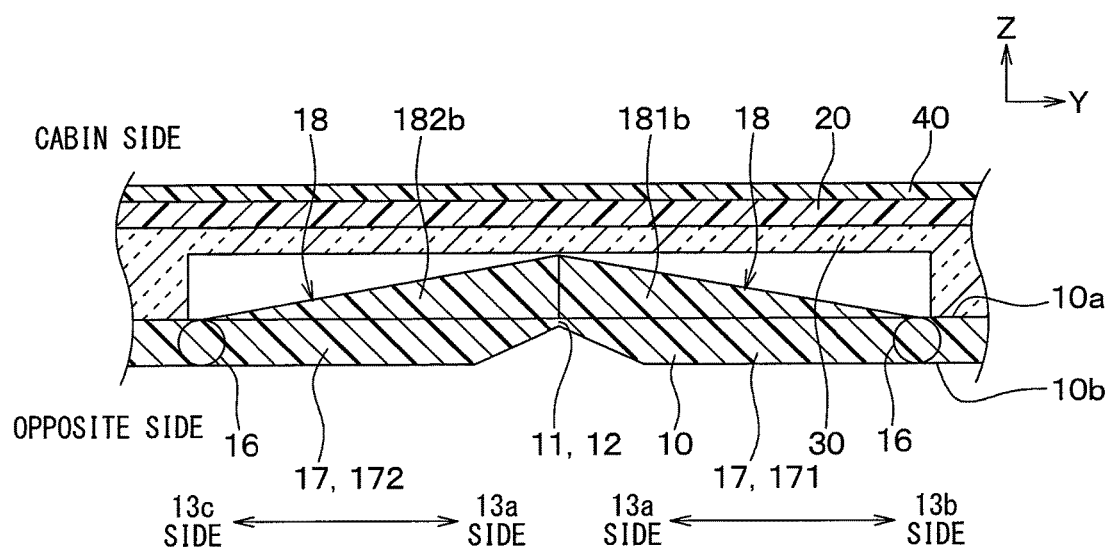
FIG. 30 is a sectional view taken along line XXX-XXX in FIG. 27.

As illustrated in FIG. 30, the bulge 18 has gradually changing heights in each of the first side bulges 181b and the second side bulges 182b. Specifically, the heights of the bulge 18 are reduced from a point of intersection 13a between the centerline portion 12 and each of the sideline portions 13 toward ends 13b and 13c of the corresponding one of the sideline portions 13.

As illustrated in FIG. 31, when the pair of deployment portions 17 are deployed, the bulge 18 comes into contact with and thereby applies stress to a heat insulation layer 30 and a heater main body 20, causing the heat insulation layer 30 and the heater main body 20 to break. The bulge 18 then comes into contact with the cover layer 40. Note that the entire regions of breaking edges 14 and 15 do not come into contact with the cover layer 40. The breaking edges 14 and 15 each have a straight line shape.

Here, the present embodiment is compared to a first comparative example illustrated in FIG. 32. The first comparative example is different from the present embodiment in that no bulge 18 is provided. In the first comparative example, the centerline portion J12 is formed like a straight line as explained in the description of the first embodiment. Accordingly, the breaking edges J14 and J15 each have a straight line shape.

In both of the present embodiment and the first comparative example, when the airbag apparatus 4 is deployed, the first deployment portion 171 and the second deployment portion 172 are deployed so as to cause the portions of the breaking edges 14 and 15 that are formed along the centerline portion 12 to be separated from each other.

The breaking edges J14 and J15 are thus apart from each other when in contact with the cover layer 40 in the first comparative example. That is, portions of the cover layer 40 that are in contact with the breaking edges J14 and J15 are away from each other by a distance L2.

In contrast, according to the present embodiment, as illustrated in FIG. 31, a distance L1 between portions of the cover layer 40 that are in contact with the first center bulge 181a and the second center bulge 182a can be reduced so as to be smaller than the distance L2 in the first comparative example illustrated in FIG. 32.

Both of the first center bulge 181a and the second center bulge 182a can thus apply stress to a region of the cover layer 40 that is located between the portions of the cover layer 40 that are in contact with the first center bulge 181a and the second center bulge 182a. Accordingly, the stress can be applied locally to the cover layer 40 as compared with the first comparative example. The present embodiment can thus cause the cover layer 40 to break with greater ease than the first comparative example.

In the present embodiment, the first bulge 181 and the second bulge 182 are provided in portions of the interior panel 10 in which the first deployment portion 171 and the second deployment portion 172 are located. The bulge 181, 182 in the present embodiment includes the first center bulge 181a and the second center bulge 182a. However, a center bulge may be provided in only one of the portions of the interior panel 10 in which the first deployment portion 171 and the second deployment portion 172 are located. That is, only one of the first center bulge 181a and the second center bulge 182a may be provided. In such cases, a distance between portions of the cover layer 40 that are in contact with the first deployment portion 171 and the second deployment portion 172 at the time of the deployment of the airbag apparatus 4 can be also reduced so as to be smaller than the distance L2 in the first comparative example. Effects similar to those of the present embodiment can thus be produced.

In the present embodiment, the bulge 18 has decreasing heights in the first side bulges 181b and the second side bulges 182b from the respective points of intersection 13a toward the respective ends 13b and 13c of the respective sideline portions 13. In other words, distances from the bulge 18 to the cover layer 40 decrease from the ends 13b and 13c of each of the sideline portions toward the corresponding one of the points of intersection 13a. The stress is thus applied first to a portion of the cover layer 40 that corresponds to the centerline portion 12. The portion of the cover layer 40 that corresponds to the centerline portion 12 can thus be caused to break first. Portions of the cover layer 40 that correspond to the sideline portions 13 can be caused to break next. Additionally, the portions of the cover layer 40 that correspond to the sideline portions 13 can be caused to break in the order from portions close to the respective points of intersection 13a toward the respective ends 13b and 13c. Breaking of the cover layer 40 can be controlled as described above in the present embodiment.

Eighth Embodiment

As illustrated in FIG. 33, the present embodiment is different from the seventh embodiment in that the cross sectional shape of a bulge 18 is quadrilateral. In the present embodiment, the bulge 18 has a flat end. The end of the bulge 18 may have other shapes such as a curved shape. To concentrate stress on a cover layer 40, the end of the bulge 18 is preferably sharp-edged as in the seventh embodiment.

Ninth Embodiment

Figure 34:
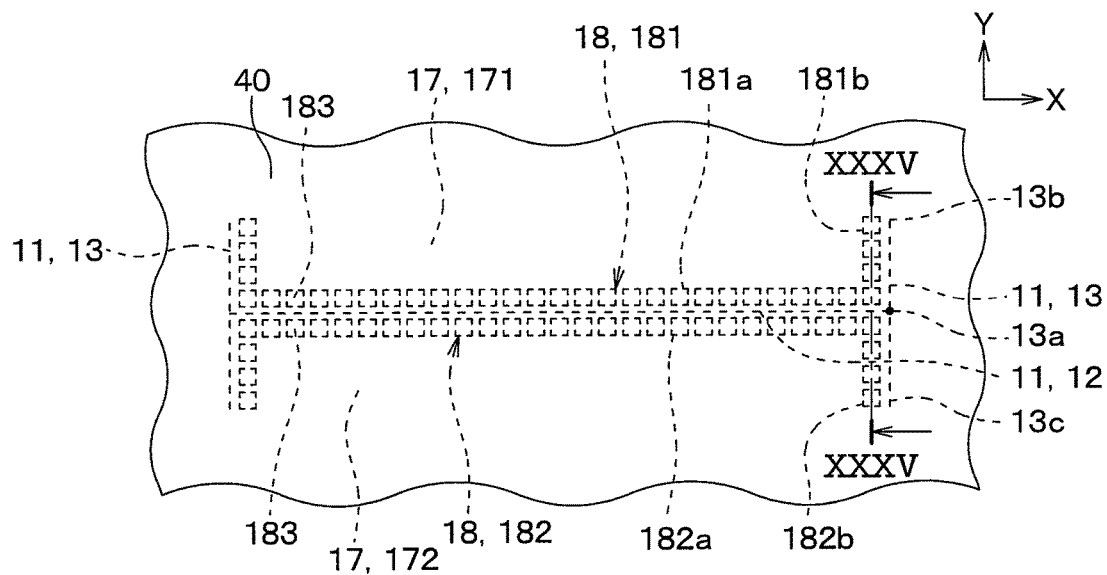
FIG. 34 is a plan view of a radiant heater apparatus according to a ninth embodiment.

As illustrated in FIG. 34, the present embodiment is different from the seventh embodiment in the placement of a bulge 18. In the present embodiment, a first center bulge 181a and a second center bulge 182a are each placed intermittently along a centerline portion 12. That is, the first center bulge 181a and the second center bulge 182a are each composed of a plurality of bulges 183 placed along the centerline portion 12. The plurality of bulges 183 is placed such that individual bulges 183 are apart from one another.

Thus, when a pair of deployment portions 17 are deployed, each of the bulges 183 configuring the first center bulge 181a and the second center bulge 182a comes into contact with a cover layer 40 in the present embodiment. The first center bulge 181a and the second center bulge 182a can thus make local contact with the cover layer 40, applying stress in a more concentrated manner to portions of the cover layer 40 that are in contact with the bulges 183.

In the present embodiment, a first side bulge 181b and a second side bulge 182b are each placed intermittently along each of sideline portions 13. That is, the first side bulge 181b and the second side bulge 182b are each composed of a plurality of bulges 183 placed along each of the sideline portions 13.

Figure 35:
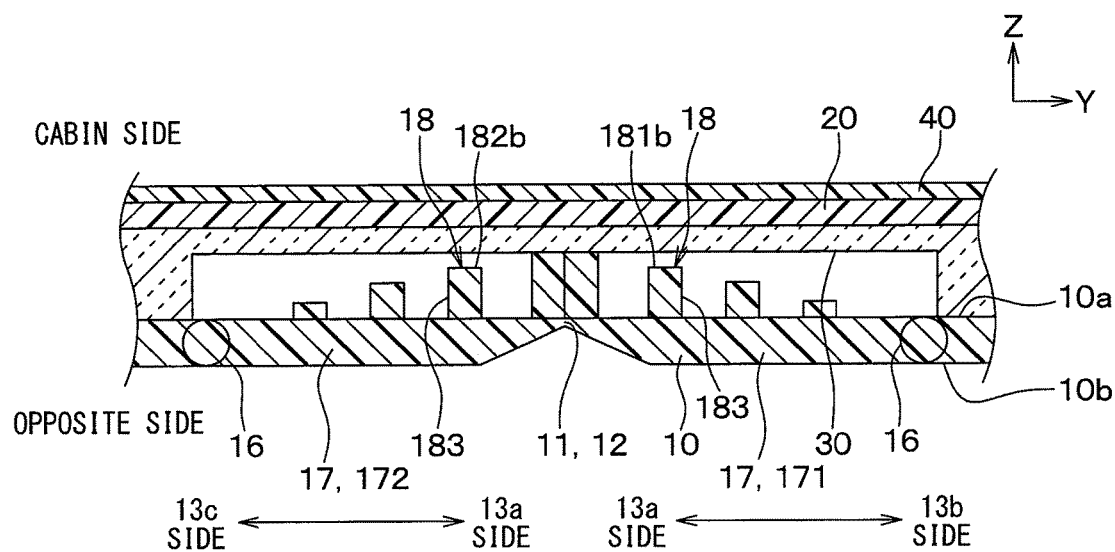
FIG. 35 is a sectional view taken along line XXXV-XXXV in FIG. 34.

As illustrated in FIG. 35, heights of the bulges 18 are reduced in the first side bulge 181b and the second side bulge 182b from a point of intersection 13a toward ends 13b and 13c of each of the sideline portions 13. The present embodiment thus also produces similar effects to those of the seventh embodiment.

Other Embodiments

While the radiant heater apparatus 1 according to each of the embodiments described above includes the heat insulation layer 30, this is not a limitation. The radiant heater apparatus 1 may include no heat insulation layer 30. In such cases, the heater main body 20 and the interior panel 10 according to any of the seventh to ninth embodiments are preferably placed apart from each other by using a spacer or the like so that the bulge 18 can be placed.

While only the centerline portion 12, out of the centerline portion 12 and the sideline portions 13 of the first embodiment, is formed like a line that has the protrusions 121 and 122, this is not a limitation. The centerline portion 12 and the sideline portions 13 may each be formed like a line having protrusions.

While the thin material portion configuring the tear portion 11 in each of the first to third embodiments extends in a line-like fashion without interruption, this is not a limitation. The thin material portion configuring the tear portion 11 may be interrupted as long as it extends in a line-like fashion.

While the thin material portions 124 are located between the adjacent openings 123 in each of the fourth to sixth embodiments, portions between the adjacent openings 123 may have the same thickness as that of other portions of the interior panel 10. Even in such cases, the portions between the adjacent openings 123 also have reduced strength. The tear portion 11 can thus be configured by using the openings 123 and the portions located between the adjacent openings 123.

While the heater main body 20 includes the heater tear portion 26 in each of the embodiments described above, this is not a limitation. If the heater main body 20 can be caused to break by the pair of breaking edges 14 and 15 or the bulge 18, the heater main body 20 may include no heater tear portion 26. While the heat insulation layer 30 includes the heat insulation layer tear portion 31, this is similarly not a limitation. If the heat insulation layer 30 can be caused to break by the breaking edges 14 and 15 or the bulge 18, the heat insulation layer 30 may include no heat insulation layer tear portion 31.

Figure 36:
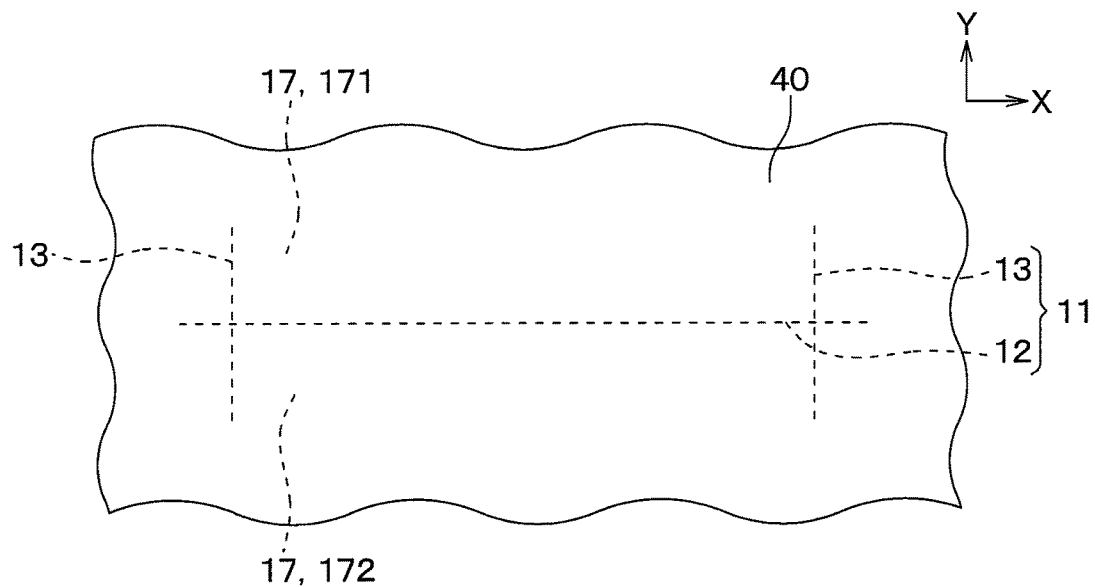
FIG. 36 is a plan view of a radiant heater apparatus according to another embodiment, illustrating the layout of a panel tear portion in a plan view.
Figure 37:
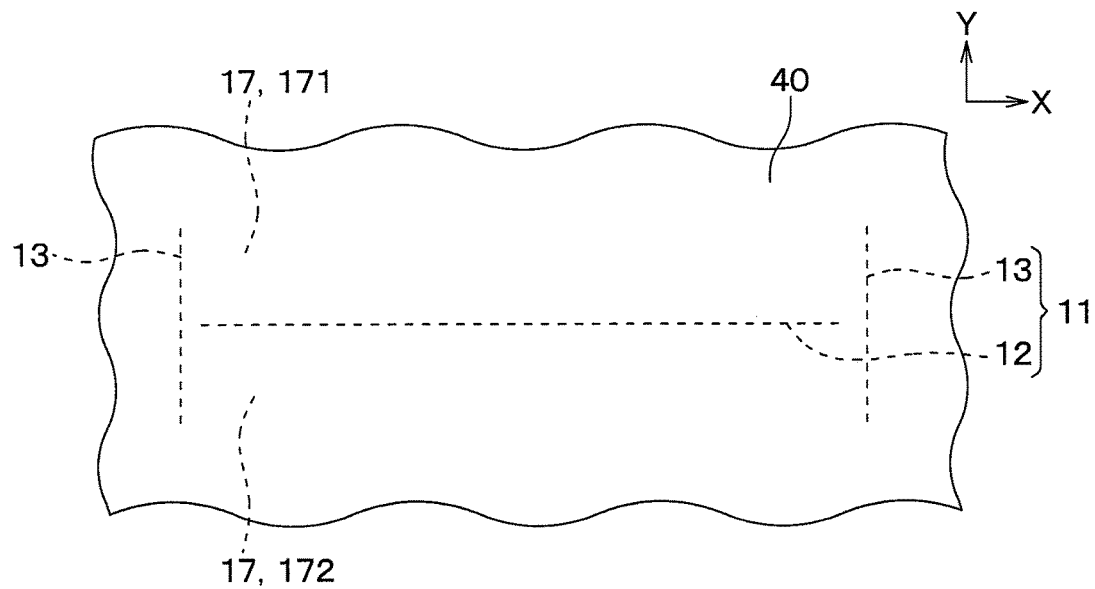
FIG. 37 is a plan view of a radiant heater apparatus according to another embodiment, illustrating the layout of a panel tear portion in a plan view.

While the sideline portions 13 each are placed at the ends of the centerline portion 12 in each of the embodiments described above as illustrated in figures such as FIG. 6, this is not a limitation. As illustrated in FIGS. 36 and 37, the sideline portions 13 each may be placed in a portion near each of the ends of the centerline portion 12. In an example illustrated in FIG. 36, the sideline portions 13 each intersect with the centerline portion 12 and are away from the ends of the centerline portion 12. In an example illustrated in FIG. 37, the sideline portions 13 do not intersect with the centerline portion 12 and are away from the ends of the centerline portion 12. In short, each of the sideline portions 13 should be placed near or at a corresponding one of the ends of the centerline portion 12.

Figure 38:
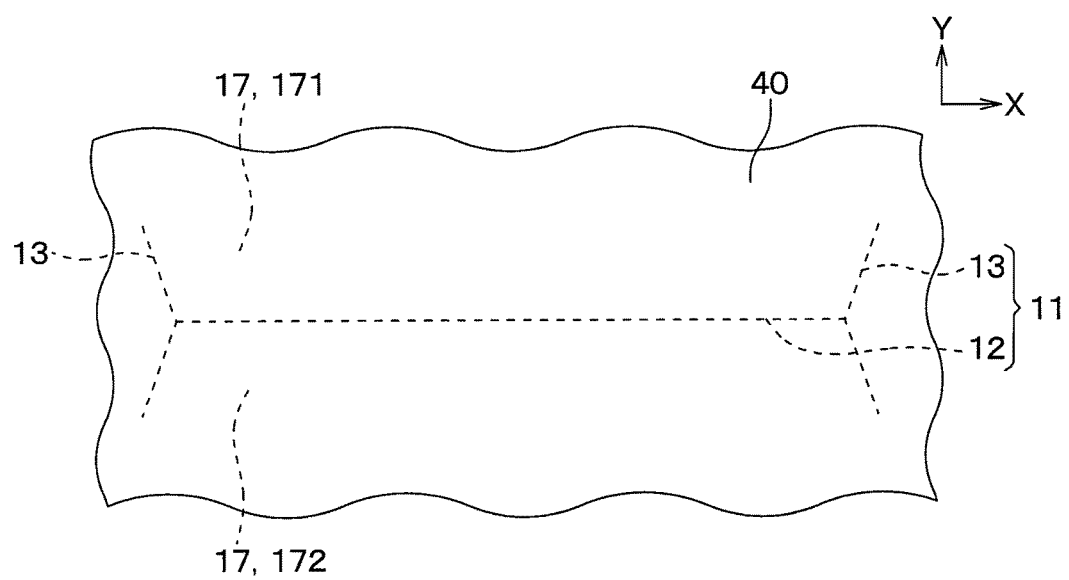
FIG. 38 is a plan view of a radiant heater apparatus according to another embodiment, illustrating the layout of a panel tear portion in a plan view.

The sideline portions 13 extend straight in the Y direction in each of the embodiments described above as illustrated in figures such as FIG. 6. However, as illustrated in FIG. 38, the sideline portions 13 may each extend straight in an oblique direction with respect to the Y direction. As described above, the sideline portions 13 may each extend in a direction other than the Y direction as long as the direction intersects with the centerline portion 12.

It should be appreciated that the present disclosure is not limited to the embodiments described above and can be modified appropriately within the scope of the appended claims. The embodiments above are not irrelevant to one another and can be combined appropriately unless a combination is obviously impossible.

In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to shapes and positional relations, the components are not limited to the shapes and the positional relations unless explicitly specified or limited to particular shapes and positional relations in principle.

What is claimed is:

1. A radiant heater apparatus for a vehicle provided with an airbag apparatus to emit radiant heat toward an occupant in a cabin of the vehicle, the radiant heater apparatus comprising:
   an interior panel disposed on a cabin side of the airbag apparatus;
   a heater main body disposed on a cabin side of the interior panel, and shaped in a sheet to generate and emit radiant heat; and
   a cover layer disposed on a cabin side of the heater main body to cover the heater main body, wherein
   the interior panel includes a deployment portion to be deployed into the cabin by a deployment of the airbag apparatus, the deployment portion having a breaking edge where a panel tear portion breaks when the airbag apparatus is deployed,
   the panel tear portion includes: a centerline portion that extends in one direction from one side to another side of the one direction; and a pair of sideline portions, each of the sideline portions extending in a direction that intersects with the centerline portion at or near a corresponding end of the centerline portion,
   the deployment portion includes the breaking edge to be formed along the centerline portion or the sideline portions,
   the deployment portion has a stress concentration portion that locally applies stress to the cover layer while at least a part of the breaking edge formed along the centerline portion is not in contact with the cover layer when the deployment portion is deployed and comes into contact with the cover layer,
   the centerline portion comprises a thin material portion, the thin material portion is disposed in a line shape on which protrusions are continuously and alternately arranged, with orientations of the protrusions opposite to each other, to cause the breaking edge to be shaped to have protrusions, and
   the protrusions of the breaking edge formed along the centerline portion define the stress concentration portion when the protrusions come into contact with the cover layer.

2. A radiant heater apparatus for a vehicle provided with an airbag apparatus to emit radiant heat toward an occupant in a cabin of the vehicle, the radiant heater apparatus comprising:
   an interior panel disposed on a cabin side of the airbag apparatus;
   a heater main body disposed on a cabin side of the interior panel, and shaped in a sheet to generate and emit radiant heat; and
   a cover layer disposed on a cabin side of the heater main body to cover the heater main body, wherein
   the interior panel includes a deployment portion to be deployed into the cabin by a deployment of the airbag apparatus, the deployment portion having a breaking edge where a panel tear portion breaks when the airbag apparatus is deployed,
   the panel tear portion includes: a centerline portion that extends in one direction from one side to another side of the one direction; and a pair of sideline portions, each of the sideline portions extending in a direction that intersects with the centerline portion at or near a corresponding end of the centerline portion,
   the deployment portion includes the breaking edge to be formed along the centerline portion or the sideline portions,
   the deployment portion has a stress concentration portion that locally applies stress to the cover layer while at least a part of the breaking edge formed along the centerline portion is not in contact with the cover layer, when the deployment portion is deployed and comes into contact with the cover layer,
   the centerline portion comprises: openings arranged apart from one another; and material portions located between the openings adjacent to each other,
   the material portions come to have protrusions when the material portions break, and
   the protrusions formed along the centerline portion define the stress concentration portion when the protrusions come into contact with the cover layer.

3. A radiant heater apparatus for a vehicle provided with an airbag apparatus to emit radiant heat toward an occupant in a cabin of the vehicle, the radiant heater apparatus comprising:
   an interior panel disposed on a cabin side of the airbag apparatus;
   a heater main body disposed on a cabin side of the interior panel, and shaped in a sheet to generate and emit radiant heat; and
   a cover layer disposed on a cabin side of the heater main body to cover the heater main body, wherein
   the interior panel includes a deployment portion to be deployed into the cabin by a deployment of the airbag apparatus, the deployment portion having a breaking edge where a panel tear portion breaks when the airbag apparatus is deployed,
   the panel tear portion includes: a centerline portion that extends in one direction from one side to another side of the one direction; and a pair of sideline portions, each of the sideline portions extending in a direction that intersects with the centerline portion at or near a corresponding end of the centerline portion, the deployment portion includes the breaking edge to be formed along the centerline portion or the sideline portions, the deployment portion has a stress concentration portion that locally applies stress to the cover layer while at least a part of the breaking edge formed along the centerline portion is not in contact with the cover layer, when the deployment portion is deployed and comes into contact with the cover layer, the deployment portion comprises a first deployment portion and a second deployment portion on opposite sides of the centerline portion, the first deployment portion and the second deployment portion are deployed so as to cause the breaking edges formed along the centerline portion to separate from each other when the airbag apparatus is deployed, the interior panel includes a center bulge along the centerline portion in at least one of the first deployment portion and the second deployment portion, the center bulge protrudes toward the cover layer before the panel tear portion breaks, the center bulge comes into contact with the cover layer as the stress concentration portion when the first deployment portion and the second deployment portion are deployed, each of the sideline portions has an intersection point intersecting with the centerline portion between ends of the corresponding sideline portion, the interior panel includes: a first side bulge along the pair of sideline portions in the first deployment portion; and a second side bulge along the pair of sideline portions in the second deployment portion, the first side bulge and the second side bulge protrude toward the cover layer before the panel tear portion breaks, a distance from the first side bulge to the cover layer decreases as approaching the intersection point from the respective ends of the sideline portion, and a distance from the second side bulge to the cover layer decreases as approaching the intersection point from the respective ends of the sideline portion.

4. The radiant heater apparatus according to claim 3, wherein the center bulge comprises: a first center bulge located to correspond to the first deployment portion; and a second center bulge located to correspond to the second deployment portion.

5. The radiant heater apparatus according to claim 4, wherein each of the first center bulge and the second center bulge includes a plurality of bulges apart from one another along the centerline portion.

\* \* \* \* \*